United States Patent
Ishiga

(10) Patent No.: US 9,723,288 B2
(45) Date of Patent: *Aug. 1, 2017

(54) IMAGE PROCESSING APPARATUS, IMAGE-CAPTURING APPARATUS AND IMAGE PROCESSING METHOD

(71) Applicant: NIKON CORPORATION, Tokyo (JP)

(72) Inventor: Kenichi Ishiga, Yokohama (JP)

(73) Assignee: NIKON CORPORATION, Tokyo (JP)

(*) Notice: Subject to any disclaimer, the term of this patent is extended or adjusted under 35 U.S.C. 154(b) by 106 days.

This patent is subject to a terminal disclaimer.

(21) Appl. No.: 14/539,631

(22) Filed: Nov. 12, 2014

(65) Prior Publication Data

US 2015/0062308 A1  Mar. 5, 2015

Related U.S. Application Data

(63) Continuation of application No. PCT/JP2013/003750, filed on Jun. 14, 2013.

(30) Foreign Application Priority Data

Jun. 22, 2012  (JP) .................................. 2012-141445

(51) Int. Cl.
*H04N 13/02* (2006.01)
*H04N 13/00* (2006.01)
(Continued)

(52) U.S. Cl.
CPC ......... *H04N 13/0011* (2013.01); *G06T 7/593* (2017.01); *G06T 7/97* (2017.01);
(Continued)

(58) Field of Classification Search
CPC . G06T 2207/10012; G06T 2207/20228; G06T 7/0022; G06T 7/0075;
(Continued)

(56) References Cited

U.S. PATENT DOCUMENTS 8,482,654 B2 * 7/2013 Lipton ............... H04N 13/0022
348/340
8,570,360 B2 * 10/2013 Era .................... H04N 13/0033
235/462.01
(Continued)

FOREIGN PATENT DOCUMENTS

CN       101964918 A    2/2011
JP       A-2003-7994    1/2003
(Continued)

OTHER PUBLICATIONS

Ito et al, Implementing Basic Image Processing Programs onto a Linearly Connected Parallel Processor, 2010.*
(Continued)

*Primary Examiner* — Shan Elahi
(74) *Attorney, Agent, or Firm* — Oliff PLC

(57) ABSTRACT

An image processing apparatus includes a receiving unit configured to receive at least two parallax images that are obtained from a subject image captured via a single optical system, where the at least two parallax images include an image in a first viewpoint direction and an image in a second viewpoint direction, an average calculating unit configured to calculate, for each pixel, an arithmetic average and a geometric average between the image in the first viewpoint direction and the image in the second viewpoint direction, a ratio calculating unit configured to calculate, for each pixel, a ratio of the arithmetic average to the geometric average, and a disparity calculating unit configured to calculate, on a pixel-by-pixel basis, a disparity between the image in the first viewpoint direction and the image in the second viewpoint direction based on the ratio.

16 Claims, 21 Drawing Sheets

(51) Int. Cl.
*G06T 7/00* (2017.01)
*G06T 7/593* (2017.01)

(52) U.S. Cl.
CPC ..... *H04N 13/0207* (2013.01); *H04N 13/0214* (2013.01); *H04N 13/0282* (2013.01); *G06T 2207/10012* (2013.01); *G06T 2207/20228* (2013.01); *H04N 2013/0081* (2013.01)

(58) Field of Classification Search
CPC ........... H04N 13/0011; H04N 13/0207; H04N 13/0214; H04N 13/0282; H04N 2013/0081
USPC .......................................................... 348/49
See application file for complete search history.

(56) References Cited

U.S. PATENT DOCUMENTS

| | | | | |
|---|---|---|---|---|
| 8,619,082 | B1* | 12/2013 | Ciurea ..................... | G06T 7/593 345/427 |
| 8,873,813 | B2* | 10/2014 | Tadayon ................... | G06K 9/00 382/118 |
| 9,030,594 | B1* | 5/2015 | Bhakta .................. | H04N 17/002 348/349 |
| 9,361,668 | B2* | 6/2016 | Ishigami ................. | G06T 5/001 |
| 9,363,500 | B2* | 6/2016 | Takahashi ............. | H04N 19/597 |
| 2007/0285554 | A1* | 12/2007 | Givon ..................... | G03H 1/268 348/340 |
| 2009/0097564 | A1* | 4/2009 | Chen ...................... | H04N 19/61 375/240.17 |
| 2010/0091846 | A1* | 4/2010 | Suzuki ................. | H04N 19/105 375/240.12 |
| 2010/0328433 | A1* | 12/2010 | Li .......................... | G02B 27/26 348/46 |
| 2011/0018969 | A1* | 1/2011 | Tanaka ............... | H04N 5/23296 348/47 |
| 2011/0255775 | A1* | 10/2011 | McNamer ............. | G06T 7/0075 382/154 |
| 2012/0057000 | A1* | 3/2012 | Rohaly .................. | G03B 35/08 348/49 |
| 2012/0098936 | A1* | 4/2012 | Nonaka .............. | H04N 5/23293 348/46 |
| 2012/0162374 | A1* | 6/2012 | Markas .............. | H04N 13/0221 348/46 |
| 2012/0257018 | A1* | 10/2012 | Shigemura ......... | G02B 27/2214 348/46 |
| 2013/0147920 | A1* | 6/2013 | Kobayashi ............... | G02B 7/38 348/46 |
| 2013/0182082 | A1* | 7/2013 | Hayashi ............. | H04N 5/23258 348/49 |
| 2013/0222546 | A1* | 8/2013 | Takahashi ......... | H01L 27/14623 348/46 |
| 2013/0278596 | A1* | 10/2013 | Wu ......................... | G06T 15/00 345/419 |
| 2015/0062307 | A1* | 3/2015 | Ishiga ................ | H04N 13/0217 348/49 |
| 2015/0156430 | A1* | 6/2015 | Ishiga ..................... | G06T 5/002 348/241 |
| 2015/0264333 | A1* | 9/2015 | Ishiga ............... | H01L 27/14623 382/154 |
| 2016/0094835 | A1* | 3/2016 | Takanashi .............. | H04N 5/243 348/54 |

FOREIGN PATENT DOCUMENTS

| | | | | |
|---|---|---|---|---|
| JP | B2-4517449 | | 8/2010 | |
| WO | WO 2012032826 | A1 * | 3/2012 | ......... H04N 5/23258 |

OTHER PUBLICATIONS

Schemmel et al, A 66×66 pixels edge detection array with digital readout, 1999.*
Jan. 7, 2016 Office Action issued in Chinese Patent Application No. 201380026360.2.
Lucas et al., "An Iterative Image Registration Technique with an Application to Stereo Vision," *Proceedings of Imaging Understanding Workshop*, 1981, pp. 121-130.
Baker et al., "A Database and Evaluation Methodology for Optical Flow," *Int J Comput Vis*, 2011, pp. 1-31.
International Search Report issued in International Application No. PCT/JP2013/003750 mailed Aug. 13, 2013 (with translation).

* cited by examiner

PARALLAX Lt PIXEL

PARALLAX Rt PIXEL

NO-PARALLAX PIXEL

PARALLAX Lt PIXEL

PARALLAX Rt PIXEL

IMAGE PROCESSING APPARATUS, IMAGE-CAPTURING APPARATUS AND IMAGE PROCESSING METHOD

The contents of the following Japanese patent applications are incorporated herein by reference:
No. 2012-141445 filed on Jun. 22, 2012, and
PCT/JP2013/003750 filed on Jun. 14, 2013.

BACKGROUND

1. Technical Field

The present invention relates to an image processing apparatus, an image-capturing apparatus and an image processing method.

2. Related Art

A known image-capturing apparatus uses a single imaging optical system to produce, with a single imaging operation, left and right parallax images having a parallax therebetween.

Patent Document 1: Japanese Patent Application Publication No. 2003-7994

To produce information regarding disparity between left and right parallax images, it is necessary to perform pattern matching on the blur regions of the left and right parallax images. The pattern matching is conducted by using the edge portions in the parallax images. However, the pattern matching only has poor accuracy since the edge portions are weakened in the blur regions.

SUMMARY

A first aspect of the innovations may include an image processing apparatus including a receiving unit configured to receive at least two parallax images that are obtained from a subject image captured via a single optical system, where the at least two parallax images include an image in a first viewpoint direction and an image in a second viewpoint direction, an average calculating unit configured to calculate, for each pixel, an arithmetic average and a geometric average between the image in the first viewpoint direction and the image in the second viewpoint direction, a ratio calculating unit configured to calculate, for each pixel, a ratio of the arithmetic average to the geometric average, and a disparity calculating unit configured to calculate, on a pixel-by-pixel basis, a disparity between the image in the first viewpoint direction and the image in the second viewpoint direction based on the ratio.

A second aspect of the innovations may include an image processing apparatus including a receiving unit configured to receive at least two parallax images that are obtained from a subject image captured via a single optical system, where the at least two parallax images include an image in a first viewpoint direction and an image in a second viewpoint direction, a difference calculating unit configured to calculate, for each pixel, a difference between the image in the second viewpoint direction and the image in the first viewpoint direction, a first derivative calculating unit configured to calculate, on a pixel-by-pixel basis, a first derivative having a component in a direction in which a viewpoint change occurs, for an image in an intermediate viewpoint constituted by an average value between the image in the first viewpoint direction and the image in the second viewpoint direction, and a distinguishing unit configured to distinguish whether the subject is in front of or behind a focus position of the optical system, based on a product of a sign of the difference and a sign of the first derivative.

A third aspect of the innovations may include an image processing apparatus including an image data obtaining unit configured to obtain first image data corresponding to a first viewpoint and second image data corresponding to a second viewpoint, where the first and second image data are obtained via a single optical system or separate sharing optical systems, and an evaluation data producing unit configured to calculate a ratio of (i) a value obtained by an adding-based operation performed on a pixel value of the first image data and a corresponding pixel value of the second image data to (ii) a value obtained by a multiplying-based operation performed on the pixel value of the first image data and the corresponding pixel value of the second image data and to produce, in association with the first image data and the second image data, evaluation data regarding disparity between the first viewpoint and the second viewpoint.

A fourth aspect of the innovations may include an image-capturing apparatus including an image sensor, and the above-described image processing apparatus. Here, the first image data and the second image data are produced based on an output from the image sensor.

A fifth aspect of the innovations may include an image processing method including obtaining first image data corresponding to a first viewpoint and second image data corresponding to a second viewpoint, where the first and second image data are obtained via a single optical system or separate sharing optical systems, and calculating a ratio of (i) a value obtained by an adding-based operation performed on a pixel value of the first image data and a corresponding pixel value of the second image data to (ii) a value obtained by a multiplying-based operation performed on the pixel value of the first image data and the corresponding pixel value of the second image data and producing, in association with the first image data and the second image data, evaluation data regarding disparity between the first viewpoint and the second viewpoint.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

A digital camera relating to the present embodiment, which is a form of an image processing apparatus and an image-capturing apparatus, is configured to be capable of producing for a single scene left- and right-viewpoint images with a single imaging operation. Here, the images from different viewpoints are referred to as parallax images.

Figure 1:
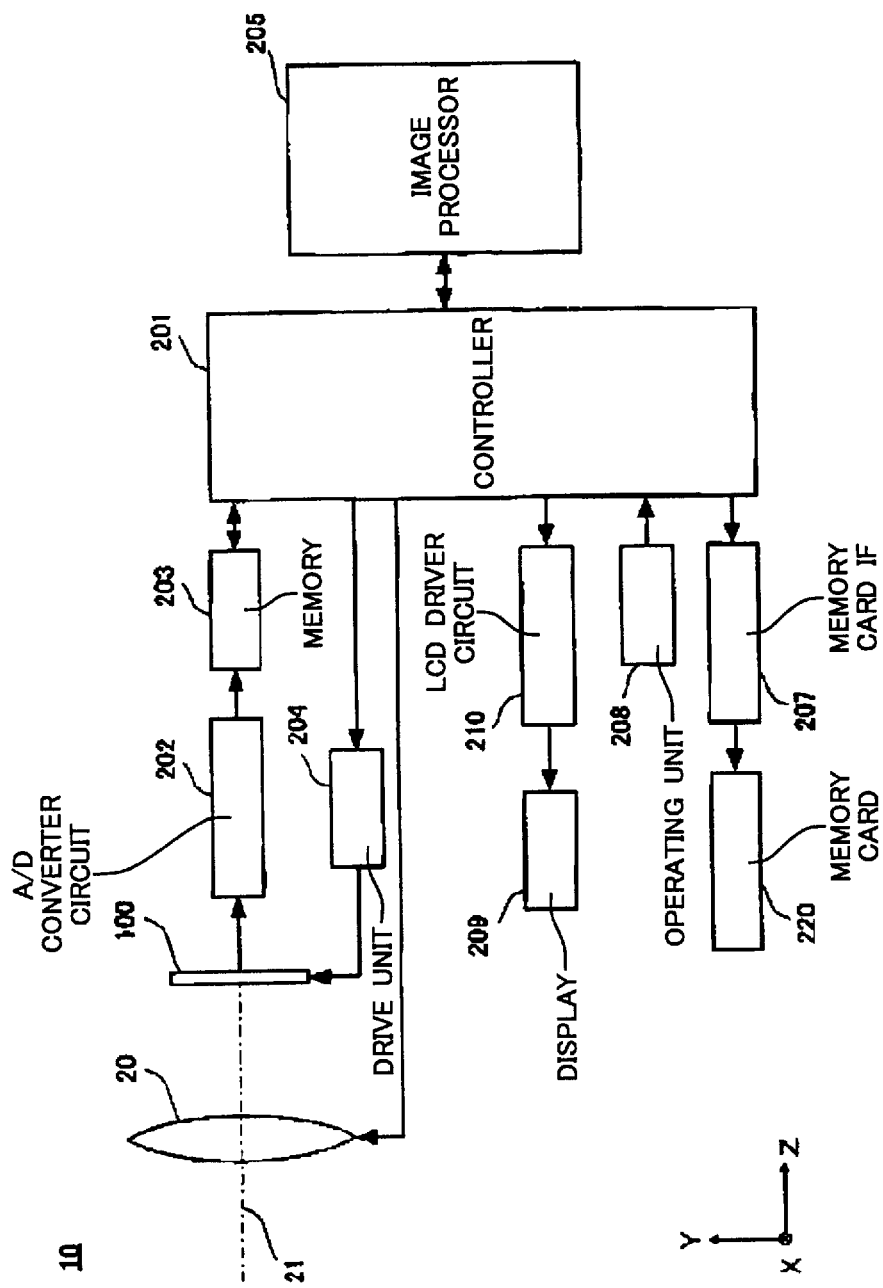
FIG. 1 illustrates the structure of a digital camera 10.

FIG. 1 illustrates the structure of a digital camera 10 relating to an embodiment of the present invention. The digital camera 10 includes an image-capturing lens 20, which is an image-capturing optical system, and guides incoming subject luminous flux along an optical axis 21 to an image sensor 100. The image-capturing lens 20 may be a replaceable lens that is attachable and detachable to/from the digital camera 10. The digital camera 10 includes the image sensor 100, a controller 201, an A/D converter circuit 202, a memory 203, a drive unit 204, an image processor 205, a memory card IF 207, an operating unit 208, a display 209, and an LCD driver circuit 210.

As shown in FIG. 1, a +Z-axis direction is defined as the direction parallel to the optical axis 21 toward the image sensor 100, an +X-axis direction is defined as the direction away from the viewer of the sheet of FIG. 1 in the plane orthogonal to the Z axis, and a +Y-axis direction is defined as the upward direction in the sheet of FIG. 1. In connection with the composition for image-capturing, the X axis corresponds to the horizontal direction and the Y axis corresponds to the vertical direction. In some of the following drawings, their coordinate axes are shown so as to show how the respective drawings are arranged relative to the coordinate axes of FIG. 1.

The image-capturing lens 20 is constituted by a group of optical lenses and configured to form an image from the subject luminous flux from a scene in the vicinity of its focal plane. For the convenience of description, the image-capturing lens 20 is hypothetically represented by a single lens positioned in the vicinity of the pupil in FIG. 1. The image sensor 100 is positioned in the vicinity of the focal plane of the image-capturing lens 20. The image sensor 100 is an image sensor having a two-dimensionally arranged photoelectric converter elements as pixels, for example, a CCD or CMOS sensor. The timing of the image sensor 100 is controlled by the drive unit 204 so that the image sensor 100 can convert a subject image formed on the light receiving surface into an image signal and outputs the image signal to the A/D converter circuit 202. The image signal output to the A/D converter circuit 202 includes image signals for left and right viewpoints.

The A/D converter circuit 202 converts the image signal output from the image sensor 100 into a digital image signal and outputs the digital image signal to the memory 203. The image processor 205 uses the memory 203 as its workspace to perform various image processing operations and thus generates image data. For example, the image processor 205 generates image data corresponding to a left viewpoint and image data corresponding to a right viewpoint. The image processor 205 additionally performs general image processing functions such as adjusting image data in accordance with a selected image format.

The image processor 205 further produces evaluation data regarding disparity between left and right viewpoints. Although described later in detail, the evaluation data can be taken as disparity map data indicating position information regarding the depth of a subject relative to a focus position.

The image data produced by the image processor 205 is converted by the LCD driver circuit 210 into a display signal and displayed on the display 209. The evaluation data may also be displayed on the display 209. In addition, the produced image data and evaluation data are stored in the memory card 220 attached to the memory card IF 207.

A series of image-capturing sequences is initiated when the operating unit 208 receives a user operation and outputs an operating signal to the controller 201. The various operations such as AF and AE associated with the image-capturing sequences are performed under the control of the controller 201. For example, the controller 201 analyzes the evaluation data to perform focus control to move a focus lens that constitutes a part of the image-capturing lens 20.

Figure 2:
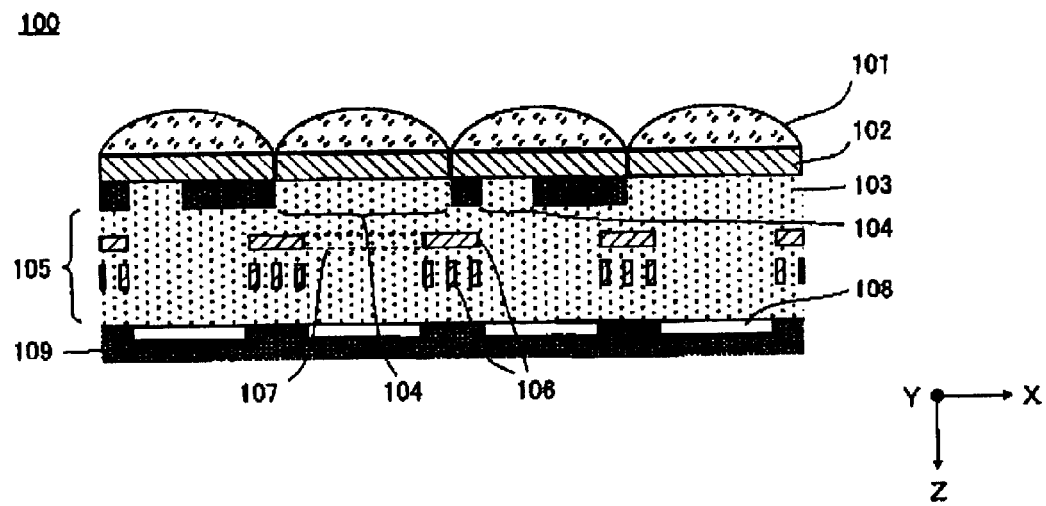
FIG. 2 is a cross-sectional view of an image sensor 100.

The following describes the structure of the image sensor 100 in detail. FIG. 2 schematically illustrates the cross-section of the image sensor 100 relating to an embodiment of the present invention.

The image sensor 100 is structured in such a manner that microlenses 101, color filters 102, aperture masks 103, an interconnection layer 105 and photoelectric converter elements 108 are arranged in the stated order when seen from the side facing a subject. The photoelectric converter elements 108 are formed by photodiodes that may convert incoming light into an electrical signal. The photoelectric converter elements 108 are arranged two-dimensionally on the surface of a substrate 109.

The image signals produced by the conversion performed by the photoelectric converter elements 108, control signals to control the photoelectric converter elements 108 and the like are transmitted and received via interconnections 106 provided in the interconnection layer 105. The aperture masks 103 having openings 104, which are provided in a one-to-one correspondence with the photoelectric converter elements 108 and arranged two-dimensionally, are provided in contact with the interconnection layer 105. Each of the openings 104 is shifted in accordance with a corresponding one of the photoelectric converter elements 108 and strictly positioned relative to the corresponding photoelectric converter element 108 as described later. As described later in more details, the aperture masks 103 having the openings 104 effectively cause parallax in the subject luminous flux received by the photoelectric converter elements 108.

On the other hand, no aperture masks 103 are provided on some of the photoelectric converter elements 108 that do not cause parallax. In other words, such photoelectric converter elements 108 are provided with the aperture masks 103 having such openings 104 that do not limit the subject luminous flux incident on the corresponding photoelectric converter elements 108 or allow the entire incident luminous flux to transmit through the aperture masks 103. Although these photoelectric converter elements 108 do not cause parallax, the incoming subject luminous flux is substantially defined by an opening 107 formed by the interconnections 106. Therefore, the interconnections 106 can be viewed as an aperture mask that does not cause parallax and allows the entire incoming luminous flux to pass. The aperture masks 103 may be arranged independently and separately from the photoelectric converter elements 108 and in correspondence with the photoelectric converter elements 108, or may be formed jointly with the photoelectric converter elements 108, like the way how the color filters 102 are manufactured.

The color filters 102 are provided on the aperture masks 103. Each of the color filters 102 is colored so as to transmit a particular wavelength range to a corresponding one of the photoelectric converter elements 108, and the color filters 102 are arranged in a one-to-one correspondence with the photoelectric converter elements 108. To output a color image, at least two different types of color filters that are different from each other need to be arranged. However, three or more different types of color filters may need to be arranged to produce a color image with higher quality. For example, red filters (R filters) to transmit the red wavelength range, green filters (G filters) to transmit the green wavelength range, and blue filters (B filters) to transmit the blue wavelength range may be arranged in a lattice pattern. The colors of the color filters are not limited to the primary colors of R, G and B, but may instead be complementary colors of Y, C and Mg. The way how the filters are specifically arranged will be described later.

The microlenses 101 are provided on the color filters 102. The microlenses 101 are each a light collecting lens to guide more of the incident subject luminous flux to the corresponding photoelectric converter element 108. The microlenses 101 are provided in a one-to-one correspondence with the photoelectric converter elements 108. The optical axis of each microlens 101 is preferably shifted so that more of the subject luminous flux is guided to the corresponding photoelectric converter element 108 taking into consideration the relative positions between the pupil center of the image-capturing lens 20 and the corresponding photoelectric converter element 108. Furthermore, the position of each of the microlenses 101 as well as the position of the opening 104 of the corresponding aperture mask 103 may be adjusted to allow more of the particular subject luminous flux to be incident, which will be described later.

Here, a pixel is defined as a single set constituted by one of the aperture masks 103, one of the color filters 102, and one of the microlenses 101, which are provided in a one-to-one correspondence with the photoelectric converter elements 108 as described above. To be more specific, a pixel with an aperture mask 103 that causes parallax is referred to as a parallax pixel, and a pixel without an aperture mask 103 that causes parallax is referred to as a no-parallax pixel. For example, when the image sensor 100 has an effective pixel region of approximately 24 mm×16 mm, the number of pixels reaches as many as approximately 12 million.

When image sensors have high light collection efficiency and photoelectric conversion efficiency, the microlenses 101 may be omitted. Furthermore, in the case of back side illumination image sensors, the interconnection layer 105 is provided on the opposite side of the photoelectric converter elements 108. In addition, the color filters 102 and the aperture masks 103 can be integrally formed by allowing the openings 104 of the aperture masks 103 to have color components. Here, the color filters 102 are omitted when monochrome image signals are only required to be output.

In the present embodiment, the aperture masks 103 are separately formed from the interconnections 106, but the function of the aperture masks 103 in the parallax pixels may be alternatively performed by the interconnections 106. In other words, defined opening shapes are formed by the interconnections 106 and limit the incident luminous flux to allow only particular partial luminous flux to pass to reach the photoelectric converter elements 108. In this case, the interconnections 106 forming the opening shapes are preferably positioned closest to the photoelectric converter elements 108 in the interconnection layer 105.

The aperture masks 103 may be formed by a transmission preventing film that is overlaid on the photoelectric converter elements 108. In this case, the aperture masks 103 are formed in such a manner that, for example, a SiN film and a $SiO_2$ film are sequentially stacked to form a transmission preventing film and regions corresponding to the openings 104 are removed by etching.

Figure 3A:
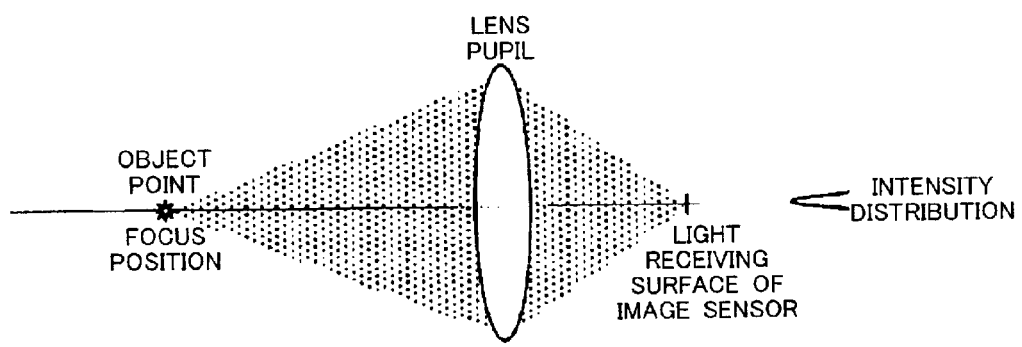
FIGS. 3A, 3B, 3C and 3D illustrate the concept of defocusing for a no-parallax pixel.

The following describes the concept of defocusing in the case where the parallax Lt pixel and the parallax Rt pixel receive light. To start with, the concept of defocusing for no-parallax pixels is briefly discussed. FIGS. 3A, 3B, 3C and 3D are used to illustrate the concept of defocusing for no-parallax pixels. As shown in FIG. 3A, when an object point, which is a subject, is at a focus position, the subject luminous flux that passes through a lens pupil and reaches the light receiving surface of an image sensor exhibits a steep optical intensity distribution having the pixel of the corresponding image point at the center. In other words, if a no-parallax pixel that receives the entire effective luminous flux passing through the lens pupil is arranged in the vicinity of the image point, the pixel corresponding to the image point has the highest output value and the surrounding pixels have radically lowered output values.

Figure 3B:
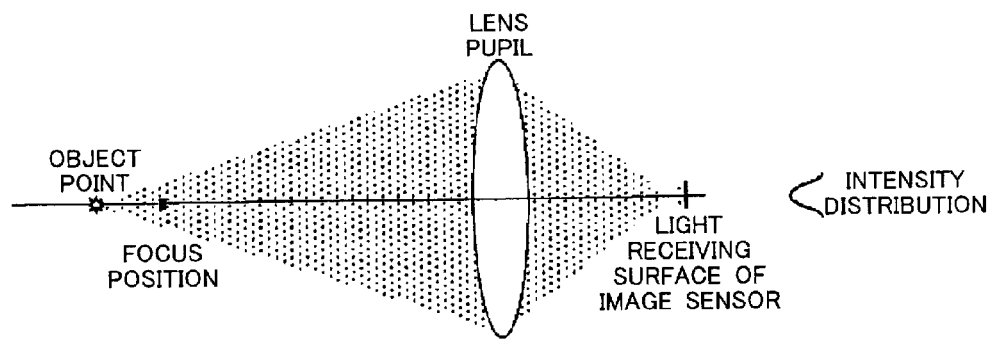

On the other hand, as shown in FIG. 3B, when the object point is off the focus position in the direction away from the light receiving surface of the image sensor, the subject luminous flux exhibits a less steep optical intensity distribution at the light receiving surface of the image sensor, when compared with the case where the object point is at the focus position. Stated differently, such a distribution is observed that the pixel of the corresponding image point has a lowered output value, and more surrounding pixels have output values.

Figure 3C:
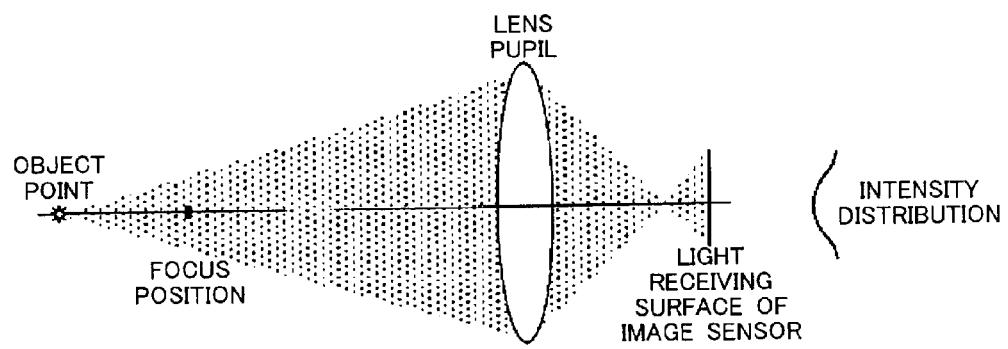

When the object point is further off the focus position as shown in FIG. 3C, the subject luminous flux exhibits a further less steep optical intensity distribution at the light receiving surface of the image sensor. Stated differently, such a distribution is observed that the pixel of the corresponding image point has a further lowered output value, and further more surrounding pixels have output values.

Figure 3D:
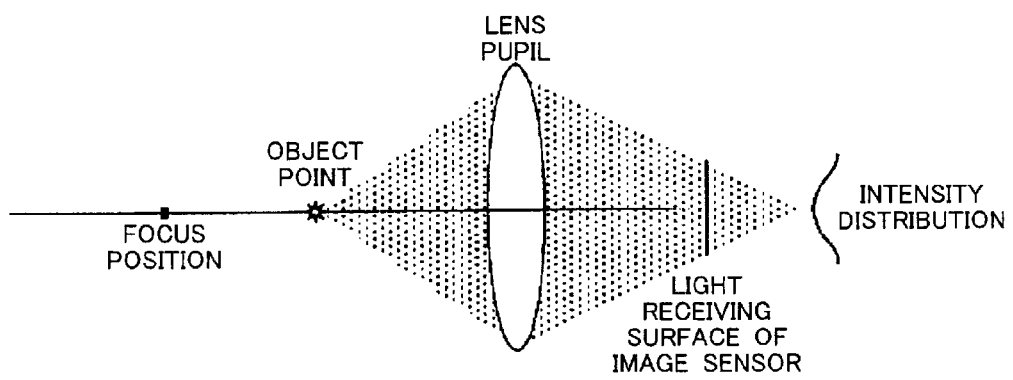

When the object point is off the focus position in the direction toward the light receiving surface of the image sensor as shown in FIG. 3D, a similar optical intensity distribution is observer to the case where the object point is off the focus position in the direction away from the light receiving surface of the image sensor.

FIGS. 4A to 4D illustrate the concept of defocusing for parallax pixels. A parallax Lt pixel and a parallax Rt pixel receive subject luminous fluxes from two parallax hypothetical pupils that are set symmetrically with respect to the optical axis as the partial regions of a lens pupil. In the present specification, a monocular pupil-division image-capturing technique means a technique of capturing parallax images by receiving subject luminous fluxes from different hypothetical pupils in a single lens pupil.

Figure 4A:
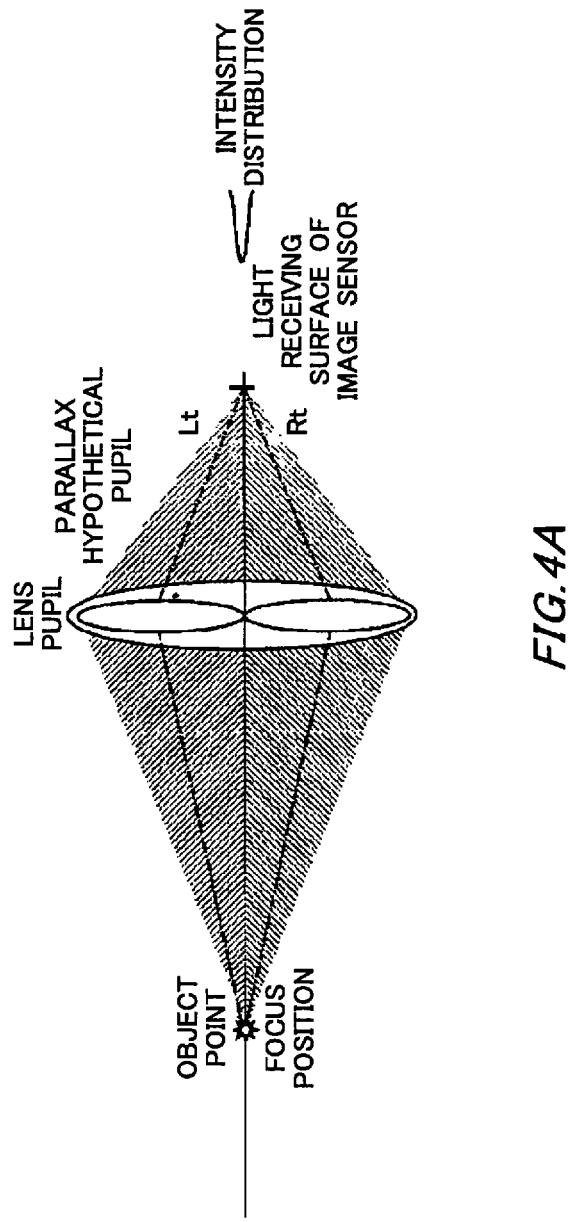
FIGS. 4A, 4B, 4C and 4D illustrate the concept of defocusing for a parallax pixel.

When an object point, which is a subject, is at a focus position as shown in FIG. 4A, both of the subject luminous fluxes passing through the respective parallax hypothetical pupils exhibit a steep optical intensity distribution having the pixel of the corresponding image point at the center. If the parallax Lt pixel is arranged in the vicinity of the image point, the pixel corresponding to the image point has the highest output value and the surrounding pixels have radically lowered output values. If the parallax Rt pixel is arranged in the vicinity of the image point, the pixel corresponding to the image point also has the highest output value and the surrounding pixels also have radically lowered output values. Thus, irrespective of which of the parallax hypothetical pupils the subject luminous flux passes through, such a distribution is observed that the pixel corresponding to the image point has the highest output value and the surrounding pixels have radically lowered output values, and the respective distributions match with each other.

Figure 4B:
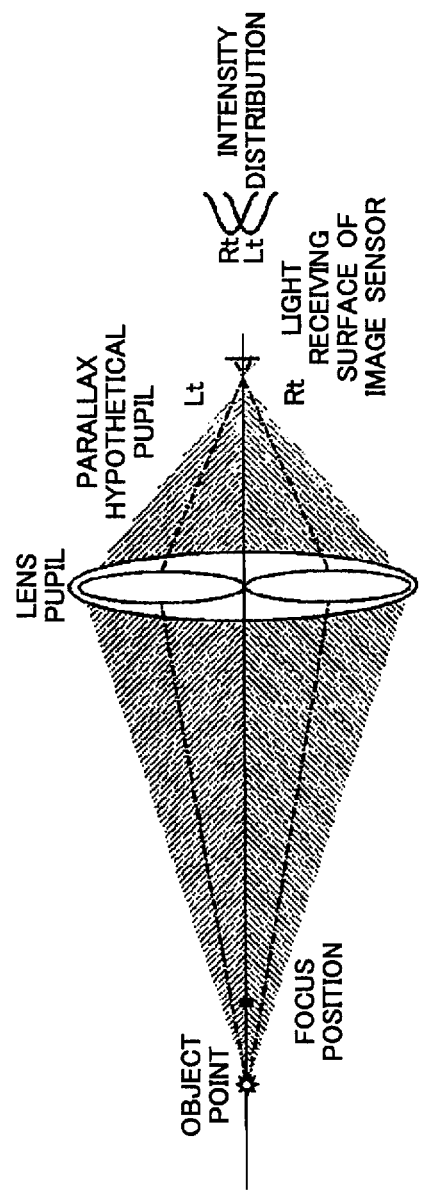

On the other hand, if the object point is off the focus position in the direction away from the light receiving surface of the image sensor as shown in FIG. 4B, the peak of the optical intensity distribution exhibited by the parallax Lt pixel appears at a position shifted in one direction from the pixel corresponding to the image point and has a lowered output value, when compared with the case where the object point is at the focus position. Furthermore, more pixels have output values. In other words, the amount of blur increases since the point image spreads in the horizontal direction of the light receiving surface of the image sensor. The peak of the optical intensity distribution exhibited by the parallax Rt pixel appears at a position shifted, from the pixel corresponding to the image point, in the opposite direction by the same distance to the peak of the optical intensity distribution exhibited by the parallax Lt pixel and has a lowered output value in a similar manner. Likewise, more pixels have output values. Thus, the identical optical intensity distributions that are less steep than the case where the object point is at the focus position are spaced away by the same distance from the pixel corresponding to the image point. The distance between the peaks of the optical intensity distributions exhibited by the parallax Lt and Rt pixels corresponds to the disparity.

Figure 4C:
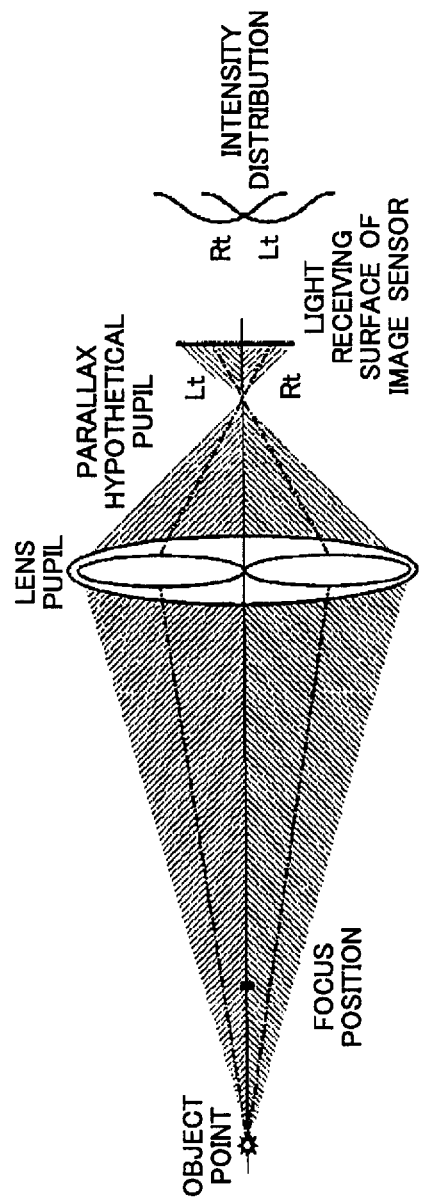

When the object point is further off the focus position as shown in FIG. 4C, the identical optical intensity distributions that are further less steep are further spaced away from the pixel corresponding to the image point when compared with the case shown in FIG. 4B. The amount of blur further increases since the point image further spreads. Furthermore, the disparity also increases since the distance between the peaks of the optical intensity distributions exhibited by the parallax Lt and Rt pixels increases. To sum up, as the object point is shifted away from the focus position, the amount of blur and the disparity increase.

Figure 4D:
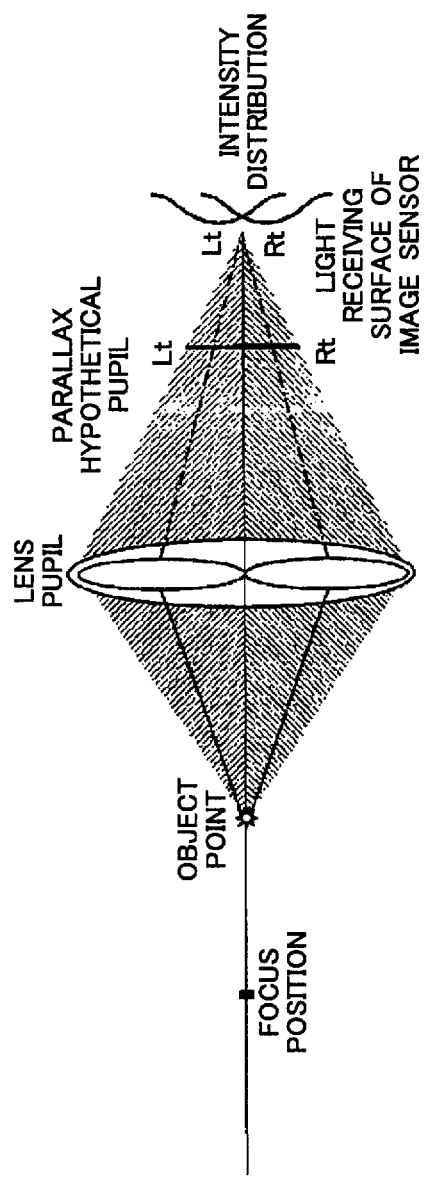

When the object point is off the focus position in the direction toward the light receiving surface of the image sensor as shown in FIG. 4D, the peak of the optical intensity distribution exhibited by the parallax Rt pixel appears at a position away in the above-mentioned one direction from the pixel corresponding to the image point, contrary to the case shown in FIG. 4C. The peak of the optical intensity distribution exhibited by the parallax Lt pixel appears at a position shifted, from the pixel corresponding to the image point, in the opposite direction to the peak of the optical intensity distribution exhibited by the parallax Rt pixel. In other words, the direction in which the object point is shifted determines the direction in which the peaks of the optical intensity distributions exhibited by the parallax Lt and Rt pixels are shifted relative to the pixel corresponding to the image point.

Figure 5A:
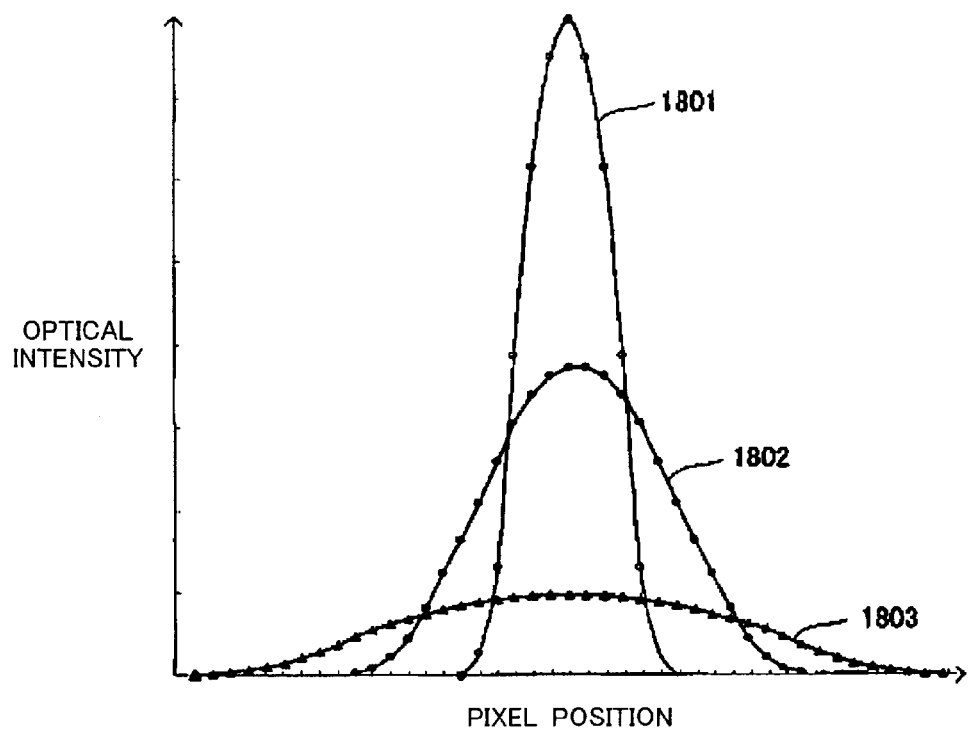
FIGS. 5A and 5B illustrate optical intensity distributions for a no-parallax pixel and a parallax pixel.
Figure 5B:
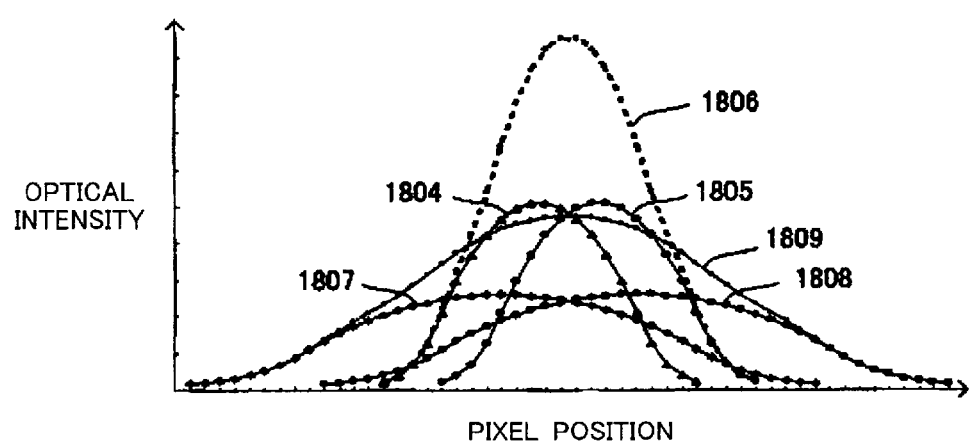

The change in optical intensity distribution illustrated in FIGS. 3A to 3D and the change in optical intensity distribution illustrated in FIGS. 4A to 4D are respectively represented by graphs in FIGS. 5A and 5B. FIGS. 5A and 5B show the optical intensity distributions exhibited by no-parallax and parallax pixels. In FIGS. 5A and 5B, the horizontal axis represents the pixel position and the center position represents the pixel position corresponding to the image point. In addition, the vertical axis represents the output value of each pixel, which is substantially in proportion to the optical intensity and thus represented as the optical intensity in FIGS. 5A and 5B.

Since similar optical intensity distributions are observed when the object point is moved away from the focus position in the direction toward the light receiving surface of the image sensor and when the object point is moved away from the focus position in the direction away from the light receiving surface of the image sensor as described above, the change in the optical intensity distribution observed when the object point is moved away from the focus position in the direction toward the light receiving surface of the image sensor is omitted in FIGS. 5A and 5B. Likewise, the peaks of the optical intensity distributions exhibited by the parallax Lt and Rt pixels when the object point is moved away from the focus position in the direction toward the light receiving surface of the image sensor are similar to the peaks of the optical intensity distributions exhibited by the parallax Lt and Rt pixels when the object point is moved away from the focus position in the direction away from the light receiving surface of the image sensor and thus omitted.

FIG. 5A is a graph showing the change in optical intensity distribution illustrated in FIGS. 3A to 3D. A distribution curve 1801 represents the optical intensity distribution corresponding to FIG. 3A and the most steep case. A distribution curve 1802 represents the optical intensity distribution corresponding to FIG. 3B, and a distribution curve 1803 represents the optical intensity distribution corresponding to FIG. 3C. When the distribution curves 1802 and 1803 are compared with the distribution curve 1801, it can be seen that the peak value gradually drops and the distribution broadens.

FIG. 5B is a graph showing the change in optical intensity distribution illustrated in FIGS. 4A to 4D. Distribution curves 1804 and 1805 respectively represent the optical intensity distributions of the parallax Lt and Rt pixels shown in FIG. 4B. As seen from FIG. 5B, these distributions are line-symmetrically shaped with respect to the center position. A composite distribution curve 1806 resulting from adding these distributions together is similarly shaped to the distribution curve 1802 corresponding to the case of FIG. 3B, which shows a similar defocused state to FIG. 4B.

Distribution curves 1807 and 1808 respectively represent the optical intensity distributions of the parallax Lt and Rt pixels shown in FIG. 4C. As seen from FIG. 5B, these distributions are also line-symmetrically shaped with respect to the center position. A composite distribution curve 1809 resulting from adding these distributions together is similarly shaped to the distribution curve 1803 corresponding to the case of FIG. 3C, which shows a similar defocused state to FIG. 4C. Here, the optical intensity distributions of the parallax Lt and Rt pixels shown in FIG. 4D are obtained by switching the positions of the optical intensity distributions of the parallax Lt and Rt pixels shown in FIG. 4C and thus respectively correspond to the distribution curves 1808 and 1807.

Figure 6A:
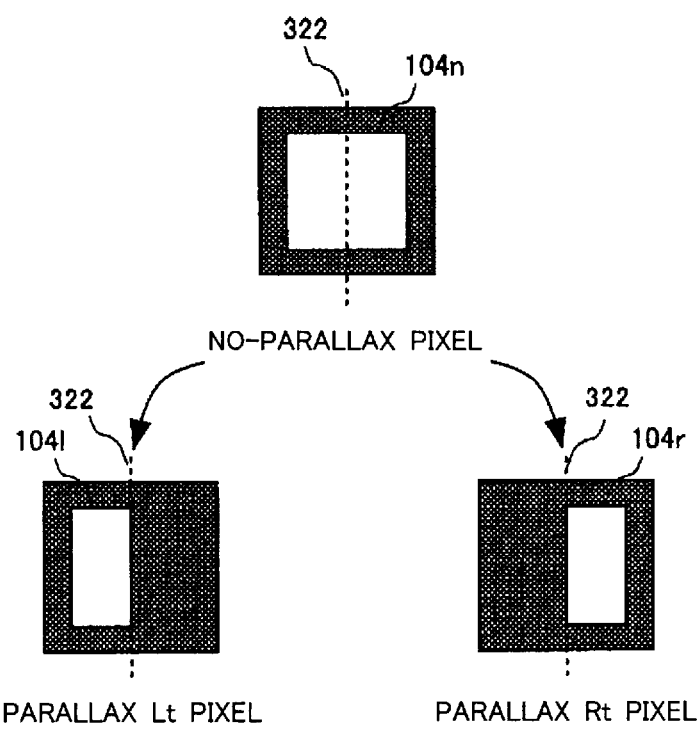
FIGS. 6A, 6B and 6C illustrate the shape of an opening 104 when there are two types of parallax pixels.
Figure 6B:
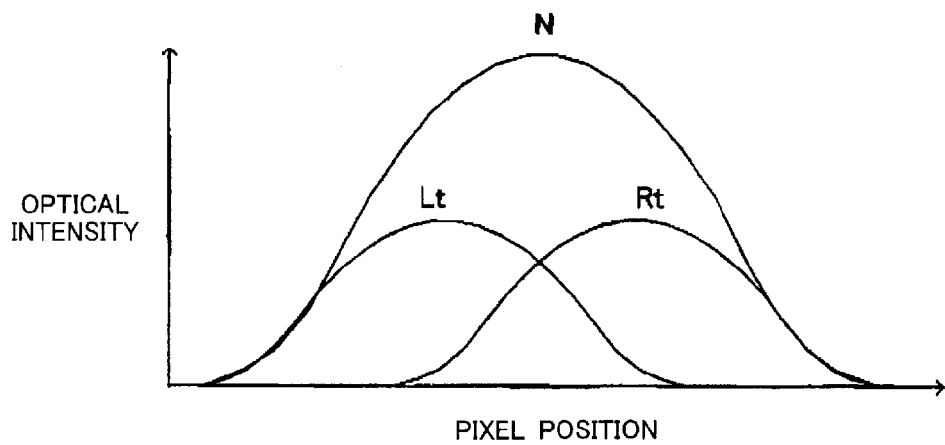
Figure 6C:
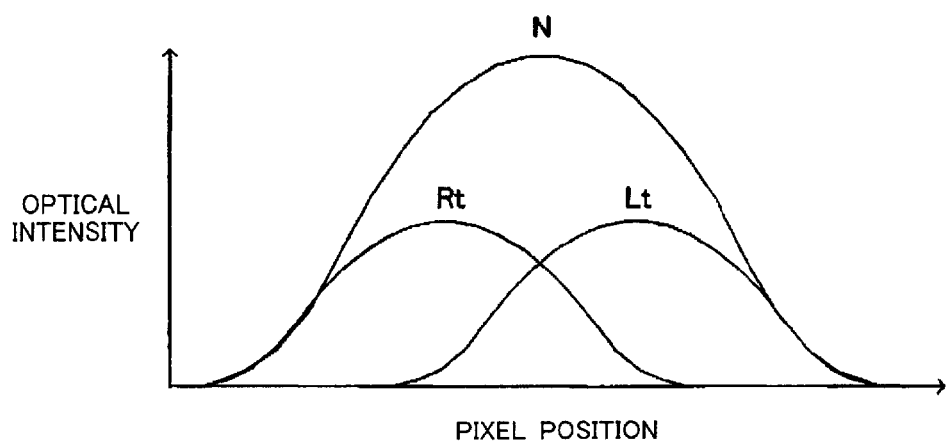

FIGS. 6A to 6C illustrate the shapes of the openings 104 when there are two types of parallax pixels. FIG. 6A shows an example where the shape of an opening 104*l* of a parallax Lt pixel and the shape of an opening 104*r* of a parallax Rt pixel are the same as the shapes obtained by dividing the shape of an opening 104*n* of a no-parallax pixel along a center line 322. In other words, in the example shown in FIG. 6A, the area of the opening 104*n* of the no-parallax pixel is equal to the sum of the area of the opening 104*l* of the parallax Lt pixel and the area of the opening 104*r* of the parallax Rt pixel. In the present embodiment, the opening 104*n* of the no-parallax pixel is referred to as a full-open opening, and the openings 104*l* and 104*r* are referred to as half-open openings. The opening 104*l* of the parallax Lt pixel and the opening 104*r* of the parallax Rt pixel are displaced in opposite directions to each other with respect to the hypothetical center line 322 coinciding with the center (pixel center) of the corresponding photoelectric converter elements 108. Thus, the opening 104*l* of the parallax Lt pixel and the opening 104*r* of the parallax Rt pixel respectively cause parallax in one direction with respect to the center line 322 and in the opposite direction to the one direction.

FIG. 6B shows the optical intensity distributions of the pixels having the openings shown in FIG. 6A, observed when the object point is off the focus position in the direction away from the light receiving surface of the image sensor. In FIG. 6B, the horizontal axis represents the pixel position and the center position represents the pixel position corresponding to the image point. In FIG. 6B, a curve Lt corresponds to the distribution curve 1804 of FIG. 5B and a curve Rt corresponds to the distribution curve 1805 of FIG. 5B. A curve N corresponds to a no-parallax pixel and is similarly shaped to the composite distribution curve 1806 of FIG. 5B. The openings 104*n*, 104*l* and 104*r* serve as an aperture stop. Thus, the blur width of the no-parallax pixel having the opening 104*n* whose area is twice as large as the opening 104*l* (opening 104*r*) is approximately the same as the blur width of the curve that is resulting from adding together the curves of the parallax Lt and Rt pixels and shown by the composite distribution curve 1806 of FIG. 5B.

FIG. 6C shows the optical intensity distributions of the pixels having the openings shown in FIG. 6A, observed when the object point is off the focus position in the direction toward the light receiving surface of the image sensor. In FIG. 6C, the horizontal axis represents the pixel position and the center position represents the pixel position corresponding to the image point. The curves Lt and Rt shown in FIG. 6C are likewise characterized in that the blur width of the no-parallax pixel having the opening 104*n* is approximately the same as the blur width of the curve resulting from adding together the curves exhibited by the parallax Lt and Rt pixels, while the positions of the curves Lt and Rt shown in FIG. 6C are switched with respect to the positions of the curves Lt and Rt shown in FIG. 6B.

The following describes how to detect parallax. Although described in detail later, estimating a blur width for a subject image is equivalent to detecting disparity in the monocular pupil-division image-capturing technique.

Figure 7A:
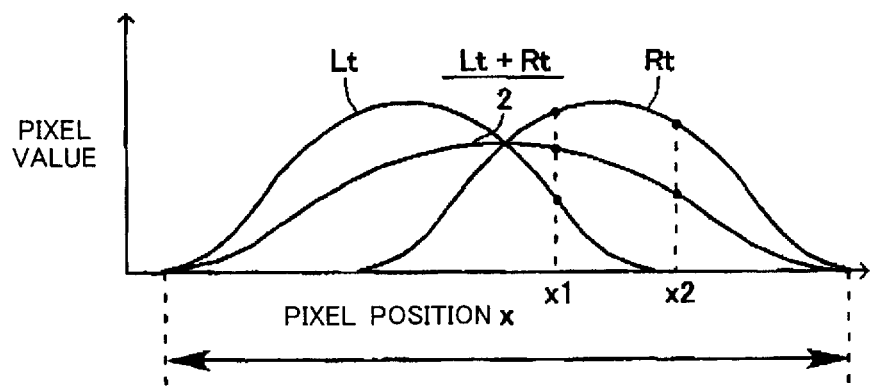
FIGS. 7A and 7B illustrate a point spread of an object point at a non-focus region.
Figure 7B:
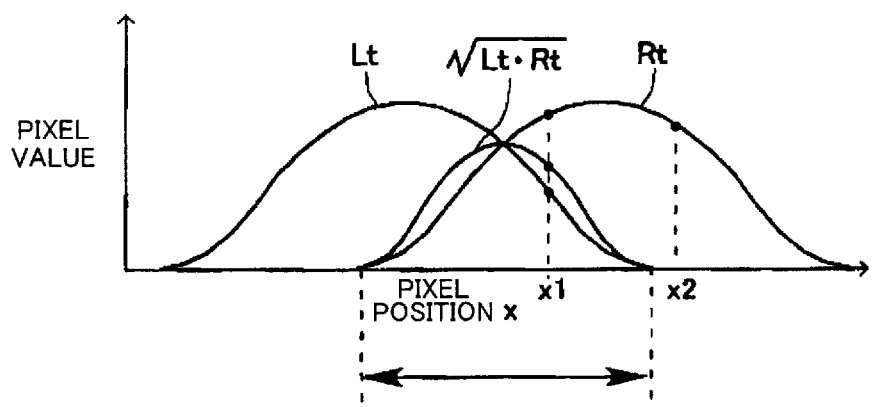

FIGS. 7A and 7B show point spreads of an object point in a non-focus region. In FIGS. 7A and 7B, the horizontal axis represents the pixel position and the center position represents the pixel position corresponding to the image point. The vertical axis represents a pixel value. In FIGS. 7A and 7B, a point spread Lt for a left viewpoint and a point spread Rt for a right viewpoint each show a blur width in the horizontal direction observed when the openings of the left and right parallax pixels are half-open as shown in FIG. 6A.

The point spread Lt for the left viewpoint and the point spread Rt for the right viewpoint in FIG. 7A are each represented as a function of the pixel position x. The arithmetic average between the point spread Lt for the left viewpoint and the point spread Rt for the right viewpoint is also represented as a function of the pixel position x. For example, at a pixel position x1, the point spreads Lt and Rt both have pixel values and the arithmetic average thus takes a positive value. At a pixel position x2, the point spread Lt does not have a pixel value but the point spread Rt has a pixel value. Thus, the arithmetic average still takes a positive value. In this manner, when the arithmetic average is calculated, the arithmetic average takes a positive value as long as one of the point spreads Lt and Rt has a pixel value. Accordingly, when the arithmetic average between the point spread Lt and the point spread Rt is calculated at each pixel position, the result has, as a whole, a spread width equal to the sum of the spread widths of the point spreads Lt and Rt as shown in FIG. 7A. This spread width is equivalent to the blur width for the no-parallax pixel having the full-open opening shown in FIG. 6A.

Here, the calculation of an arithmetic average is only an example of the calculation to obtain the sum of the spread widths of the point spreads Lt and Rt. Other calculating techniques can be used as long as the sum of the spread widths of the point spreads Lt and Rt can be obtained.

The geometric average between the point spread Lt for the left viewpoint and the point spread Rt for the right viewpoint is also represented as a function of the pixel position x. For example, at a pixel position x1, both the point spreads Lt and Rt have a pixel value and the geometric average thus takes a positive value. On the other hand, at a pixel position x2, the point spread Rt has a pixel value but the point spread Lt does not have a pixel value. Thus, the geometric average takes a value of 0. In this manner, when the geometric average is calculated, the geometric average takes a positive value when both of the point spreads Lt and Rt have a pixel value. Accordingly, when the geometric average between the point spread Lt and the point spread Rt is calculated for each pixel position, the geometric average has, as a whole, a spread width equivalent to the product of the spread widths of the point spreads Lt and Rt as shown in FIG. 7B. The spread width of the geometric average is smaller than the spread width of the arithmetic average and becomes further smaller as the disparity increases. Thus, there is a correlation between the disparity and the geometric average.

Here, the calculation of a geometric average is only an example of the calculation to obtain the product of the spread widths of the point spreads Lt and Rt. Other calculating techniques can be used as long as the product of the spread widths of the point spreads Lt and Rt can be obtained. Generally speaking, since a subject can be thought to be a collection of object points, an image of the subject can be thought to be an integral of the point images corresponding to the object points. Thus, blur of the image can be considered to be equivalent to the above-described blur represented by the point spreads.

The blur width of a subject image varies depending on which one of the arithmetic and geometric averages is employed. On the other hand, the image structure of the subject image does not vary irrespective of which one of the arithmetic and geometric averages is employed. In other words, when an average between a left parallax image and a right parallax image is calculated for an actual subject, subject images having different blur widths can be formed by employing different ones of the arithmetic and geometric averages while the subject images still have the same image structure at the same pixel position. This can be schematically represented as follows. When $I(x, y)$ denotes the image structure distribution of an ideally formed subject image, for which all of the point spread functions can be represented as a delta function $\delta(x, y)$, $B_{AND}(x, y)$ denotes the point spread function having the blur width, for the optical system, which is calculated as the geometric average, and $B_{OR}(x, y)$ denotes the point spread function having the blur width, which is calculated as the arithmetic average, the blur width ratio R (x, y) for the point spread functions of the subject image can be calculated as follows. Here, when $B_L(x, y)$ denotes the point spread function of the left-viewpoint parallax pixel and $B_R(x, y)$ denotes the point spread function of the right-viewpoint parallax pixel, the left parallax image is represented as $B_L(x, y) \otimes (x, y)$ and the right parallax image is represented as $B_R(x, y) \otimes (x, y)$. Namely, the left parallax image is represented as the product (convolution) between the image structure distribution and the point spread function of the left-viewpoint parallax pixel, and the right parallax image is represented as the product (convolution) between the image structure distribution and the point spread function of the right-viewpoint parallax pixel. $B_{AND}(x, y) \otimes (x, y)$ is the geometric average between $B_L(x, y) \otimes (x, y)$ and $B_R(x, y) \otimes (x, y)$. $B_{OR}(x, y) \otimes (x, y)$ is the arithmetic average between $B_L(x, y) \otimes (x, y)$ and $B_R(x, y) \otimes (x, y)$. Therefore, the information regarding the image structure is eliminated by calculating the ratio of the arithmetic average to the geometric average for each pixel, and only the information regarding the ratio of the blur widths of the subject images is left.

$$\frac{B_{OR}(x, y) \otimes I(x, y)}{B_{AND}(x, y) \otimes I(x, y)} \approx \frac{B_{OR}(x, y)}{B_{AND}(x, y)} = R(x, y) \geq 1 \qquad \text{[Expression 1]}$$

In addition, the blur width and disparity of a subject image depends on optical conditions. For example, the blur width of a subject image increases when the subject image is captured with the aperture value being set to F1.4 than when the subject image is captured with the aperture value being set to F8. Namely, the blur width of a subject image depends on the aperture value used to capture the subject image. On the other hand, the disparity of a subject image increases when the subject image is captured with the aperture value being set to F1.4 than when the subject image is captured with the aperture value being set to F8. Namely, the disparity of a subject image also depends on the aperture value used to capture the subject image. Accordingly, the blur width and disparity of a subject image each vary depending on the aperture value. By calculating the ratio of the arithmetic average to the geometric average for each pixel, the disparity corresponding to the aperture value is calculated. The information regarding the ratio of the blur widths of the subject images may represent the information regarding the distance from the focus plane, according to the relation shown in FIGS. 4A to 4D.

Considering such unique characteristics of the monocular pupil-division image-capturing technique that the parallax increases as the blur width increases, the ratio of the arithmetic average to the geometric average increases as the parallax increases. This is because the relation between the arithmetic average and the geometric average is equivalent to the relation between the sum and the product. When a subject is at a focus position, the arithmetic average is the same as the geometric average since the left-parallax point spread is the same as the right-parallax point spread. Thus, the ratio of the arithmetic average to the geometric average takes a value of 1 or more. The ratio of the arithmetic average to the geometric average takes a value of 1 when the subject is at the focus position, and the value of the ratio increases as the subject is moved away from the focus position. Experiments have shown that the ratio takes a value of approximately 2 at a maximum when the aperture of the lens that can achieve the largest parallax is brought into an open position.

Accordingly, the following Expression 2 is defined and such an index is obtained that no parallax is caused when the object point is at the focus position and that the parallax is larger when the object point is at the non-focus position. Here, the value of "1" is subtracted from the value of the ratio of the arithmetic average to the geometric average so that the ratio of the arithmetic average to the geometric average takes a value (reference value) of 0 when the object point is at the focus position.

$$D(x, y) = \frac{\frac{Lt(x, y) + Rt(x, y)}{2}}{\sqrt{Lt(x, y) \cdot Rt(x, y)}} - 1 \qquad \text{Expression 2}$$

Here, $0 \leq D \leq \sim 1$.

Expression 2 represents a two-dimensional map for each pixel and thus can be defined as a disparity map as it is. In the first term on the right-hand side of Expression 2, the numerator represents the blur width for a full-open pixel and the denominator represents the blur width for a half-open pixel. In this case, the following two ratios can also be considered to represent the blur width ratio.

$$D_1(x, y) = \frac{\frac{Lt(x, y) + Rt(x, y)}{2}}{Lt(x, y)} - 1 \qquad \text{Expression 3}$$

$$D_2(x, y) = \frac{\frac{Lt(x, y) + Rt(x, y)}{2}}{Rt(x, y)} - 1 \qquad \text{Expression 4}$$

However, the information regarding the image structure is not completely eliminated in Expressions 3 and 4. This is because the ratio is calculated for the image structures of different subjects at the same pixel position due to the presence of disparity between the denominator and the numerator. The following two conjugate expressions are defined to eliminate the information regarding the image structure.

$$\frac{D_1(x, y) + D_2(x, y)}{2} = \frac{1}{2} \cdot \left[ \frac{\frac{Lt(x, y)^2 + Rt(x, y)^2}{2}}{Lt(x, y) \cdot Rt(x, y)} - 1 \right] \qquad \text{Expression 5}$$

$$\frac{D_1(x, y) + D_2(x, y)}{2} = \frac{1}{2} \cdot \left[ \frac{\frac{Rt(x, y)^2 - Lt(x, y)^2}{2}}{Lt(x, y) \cdot Rt(x, y)} \right] \qquad \text{Expression 6}$$

Expressions 5 and 6 can be represented using Expression 2.

$$\frac{D_1(x, y) + D_2(x, y)}{2} = [D(x, y) + 1]^2 - 1 \qquad \text{Expression 7}$$

$$\frac{D_1(x, y) - D_2(x, y)}{2} = \frac{\frac{Rt(x, y) - Lt(x, y)}{2}}{\sqrt{Lt(x, y) \cdot Rt(x, y)}} \cdot [D(x, y) + 1] \qquad \text{Expression 8}$$

Regarding the right-hand side of Expression 7, a disparity map is extracted that changes on such a scale that the ratio of the blur width calculated as the arithmetic average to the blur width calculated as the geometric average is raised to the second power. Regarding the right-hand side of Expression 8, the ratio of the blur width calculated as the arithmetic average to the blur width calculated as the geometric average is taken into consideration in the second term. In addition, in the first term, the factor relating to the image structure is eliminated by the denominator and any sign factor resulting from the difference in signal between a left parallax image and a right parallax image is taken into consideration using the numerator.

Generally speaking, in the case of a stereoscopic image-capturing optical system, when subject images are captured for a subject that is in front of the focus position of the optical system, the subject image is shifted toward the right in a left parallax image and toward the left in a right parallax image. On the other hand, when subject images are captured for a subject that is behind the focus position of the optical system, the subject image is shifted toward the left in a left parallax image and toward the right in a right parallax image. Expression 8 includes the information representing these shifting directions.

Experiments were performed to analyze the meaning of Expression 8 and have found the following fact. When a subject is in the region in front of the focus region (a fore-focus region), a positive sign is obtained for the region in which the subject image becomes brighter toward the right and a negative sign is obtained for the region in which the subject image becomes darker toward the right. On the other hand, when the subject is in the region behind the focus region (a back-focus region), a negative sign is obtained for the region in which the subject image becomes brighter toward the right and a positive sign is obtained for the region in which the subject image becomes darker toward the right.

Therefore, it becomes possible to distinguish whether the subject is in front of or behind the focus point by adding an operation to reverse the sign for the subject region in which the subject image becomes darker toward the right. Namely, if the sign factor attributed to the image structure of the subject can be eliminated from the sign of the first term on the right-hand side of Expression 8, Expression 8 can represent whether the subject is in front of or behind the focus point as the sign and can provide signed disparity information, according to which the disparity increases in proportion to the distance of the subject from the focus point.

The sign factor attributed to the image structure can be successfully eliminated from the sign of Expression 8, by multiplying the sign factor with the sign of the first derivative in the horizontal direction of the subject image. A no-parallax image is used as a representative subject image. When N denotes an arithmetic average image between a left parallax image and a right parallax image, the following Expression 9 is obtained.

$$N(x, y) = \frac{Lt(x, y) + Rt(x, y)}{2} \quad \text{Expression 9}$$

Accordingly, a signed disparity map can be obtained by newly defining the following quantity.

$$\frac{D_1(x, y) - D_2(x, y)}{2} \cdot \text{sign}\left(\frac{\partial N(x, y)}{\partial x}\right) = \quad \text{Expression 10}$$

-continued $$\frac{\frac{Rt(x, y) - Lt(x, y)}{2}}{\sqrt{Lt(x, y) \cdot Rt(x, y)}} \cdot [D(x, y) + 1] \cdot \text{sign}\left(\frac{\partial N(x, y)}{\partial x}\right)$$

As shown in the right-hand side of Expression 10, the ratio of the difference between the parallax images to the geometric average between the parallax images is multiplied by the sign of the first derivative to correct the positive/negative sign of the value of the ratio. Here, sign (x) takes the following values as shown in Expression 11.

$$\text{sign}(x) = \begin{cases} 1 & \text{... if } x > 0 \\ 0 & \text{... if } x = 0 \\ -1 & \text{... if } x < 0 \end{cases} \quad \text{Expression 11}$$

Expression 11 can be generalized and redefined as follows with respect to a threshold value Th. The value of the threshold value Th can be determined with respect to the variation of the noise of image data.

$$\text{sign}(x) = \begin{cases} 1 & \text{... if } x > Th \\ 0 & \text{... if } |x| \le Th \\ -1 & \text{... if } x < -Th \end{cases} \quad \text{Expression 12}$$

Here, $N(x, y)$ is only required to have information sufficient to provide an approximate subject image distribution. Thus, the arithmetic average image can be replaced with the geometric average image $\sqrt{Lt \cdot Rt}$, the Lt image or the Rt image. However, it is most preferable to use an image obtained by an averaging operation that eliminates parallax since disparity generally spans as many as several dozen pixels.

As described above, the monocular pupil-division image-capturing technique exploits the fact that parallax is included in blur and can estimate the blur width and obtain disparity information for each point by performing extremely simple averaging operations.

Note that the obtained disparity information indicates zero for a flat region. In other words, the blur width is identified that is detected in the edge region of the subject image. Accordingly, the obtained disparity map information focuses on the edge region of the image. This is not disparity map information for each region in the image. Thus, the obtained disparity information provides such disparity distribution information that the disparity disappears from the edge region to the flat region in the subject image.

First Embodiment

Image processing is performed in the following manner.
1) Monochrome parallax-multiplexed mosaic image data is input.
2) Left and Right parallax images are produced.
3) A disparity map is produced.

The respective steps are described in the stated order in the following.

1) Monochrome parallax-multiplexed mosaic image data is input.

Figure 8:
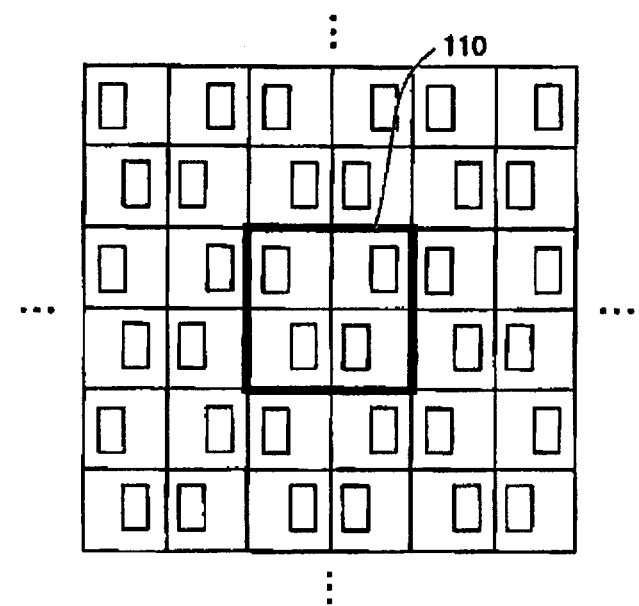
FIG. 8 illustrates an exemplary pixel arrangement.
Figure 8:
Figure 8:

FIG. 8 shows an exemplary pixel arrangement. The image sensor 100 has a primitive lattice that is defined by the bold lines in FIG. 8 and that has a pattern 110 formed by 2×2 pixels. In the pattern 110, parallax Lt pixels are assigned to the upper left and lower right pixels, and parallax Rt pixels are assigned to the lower left and upper right pixels.

The image data from the pixel arrangement shown in FIG. 8 is input. Single-plate mosaic image data having parallax multiplexed thereon is represented by M(x, y). This data may be referred to as raw data.

2) Left and Right parallax images are produced.

The image processor 205 produces left parallax image data by extracting only pixel data of the left parallax pixels from the mosaic image data M(x, y) and right parallax image data by extracting only pixel data of the right parallax pixels from the mosaic image data M(x, y). The pixel values of the empty pixel positions in the left and right parallax image data are interpolated using the surrounding pixel values. The simplest interpolating technique is calculating a simple arithmetic average of the four pixel values of the upper, lower, left and right adjacent pixels. Alternatively, direction determination may be performed to determine whether high correlation is found in the vertical or horizontal direction and the interpolation of the pixel values may be calculated in terms of the direction in which high correlation is found. In this manner, pixels values are produced for all of the pixels in the left and right parallax image data, which are respectively represented as Lt(x, y) and Rt(x,y).

3) A disparity map is produced.

After producing the left parallax image data Lt(x, y) and the right parallax image data Rt(x, y), the image processor 205 uses each pixel value in the left parallax image data Lt(x, y) and a corresponding pixel value in the right parallax image data Rt(x, y) to produce an unsigned disparity map by calculating the ratio of the arithmetic average to the geometric average. In other words, the disparity map provides an intensity distribution constituted by the positive values equal to or greater than 0 that are obtained using Expression 2. Expression 2 is shown again in the following.

$$D(x, y) = \frac{\frac{Lt(x, y) + Rt(x, y)}{2}}{\sqrt{Lt(x, y) \cdot Rt(x, y)}} - 1 \qquad \text{Expression 2}$$

Figure 9A:
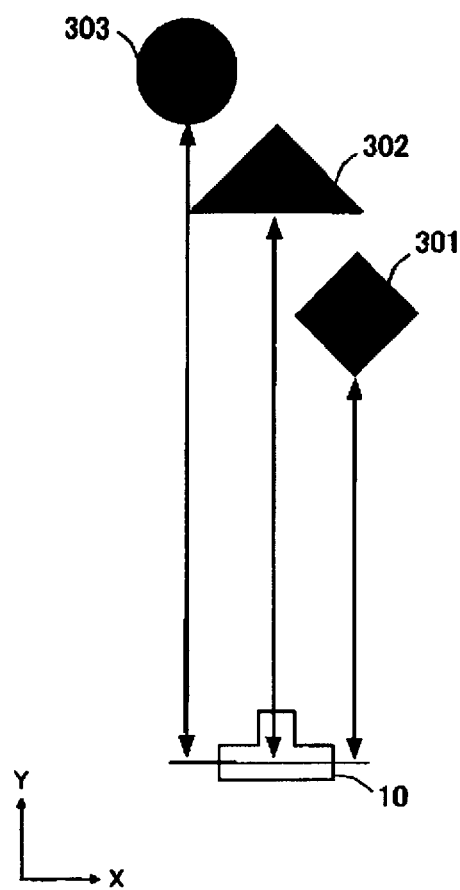
FIGS. 9A and 9B are used to illustrate an image-capturing condition and a captured image.
Figure 9B:
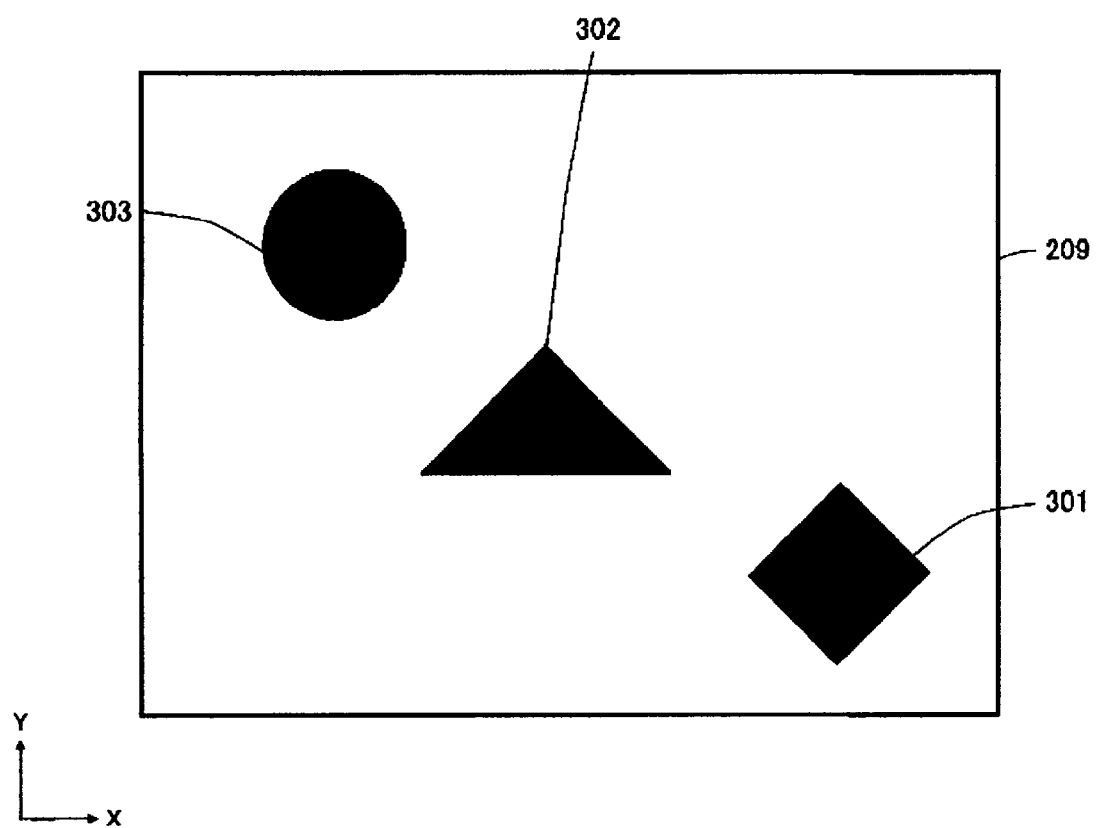

The following describes specific examples to display the disparity map. FIGS. 9A and 9B are used to illustrate an image-capturing condition and a captured image. FIG. 9A is a conceptual view illustrating the distance between the digital camera 10 and each of the subjects. There are a rectangular object 301, a triangular object 302 and a circular object 303 in the stated order from the front. FIG. 9B shows a captured image to be displayed on the display 209. Here, it is assumed that the triangular object 302 is in focus in the captured image from among the rectangular object 301, the triangular object 302 and the circular object 303. In addition, the rectangular object 301, the triangular object 302 and the circular object 303 are black and the background region is white.

Figure 10:
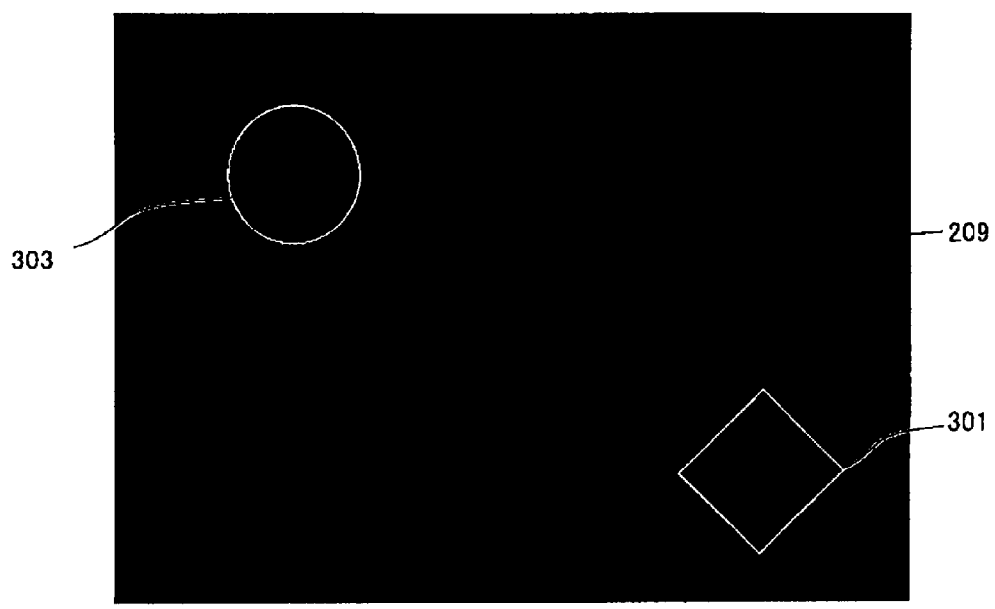
FIG. 10 illustrates a disparity map showing an intensity distribution constituted by positive values.

FIG. 10 illustrates a disparity map showing an intensity distribution constituted by positive values. FIG. 10 shows an exemplary manner in which the disparity map is displayed when Expression 2 is used. Since the rectangular object 301 and the circular object 303 are at non-focus positions, their D(x, y) values calculated using Expression 2 are larger than 0. Therefore, as shown in FIG. 10, the edge portions of the rectangular object 301 and the circular object 303 appear and have intensities corresponding to the D(x, y) values. On the other hand, since the triangular object 302 is at the focus position, the D(x, y) value is zero. Accordingly, the edge portion of the triangular object 302 does not appear.

Second Embodiment

While the image processor 205 uses Expression 2 to produce the disparity map in the first embodiment, the image processor 205 uses Expression 5 to produce an unsigned disparity map in a second embodiment. In other words, the disparity map provides an intensity distribution constituted by the positive values equal to or greater than 0 that are calculated using Expression 5. Expression 5 is shown again in the following.

$$\frac{D_1(x, y) + D_2(x, y)}{2} = \frac{1}{2} \cdot \left[ \frac{\frac{Lt(x, y)^2 + Rt(x, y)^2}{2}}{Lt(x, y) \cdot Rt(x, y)} - 1 \right] \qquad \text{Expression 5}$$

Figure 11:
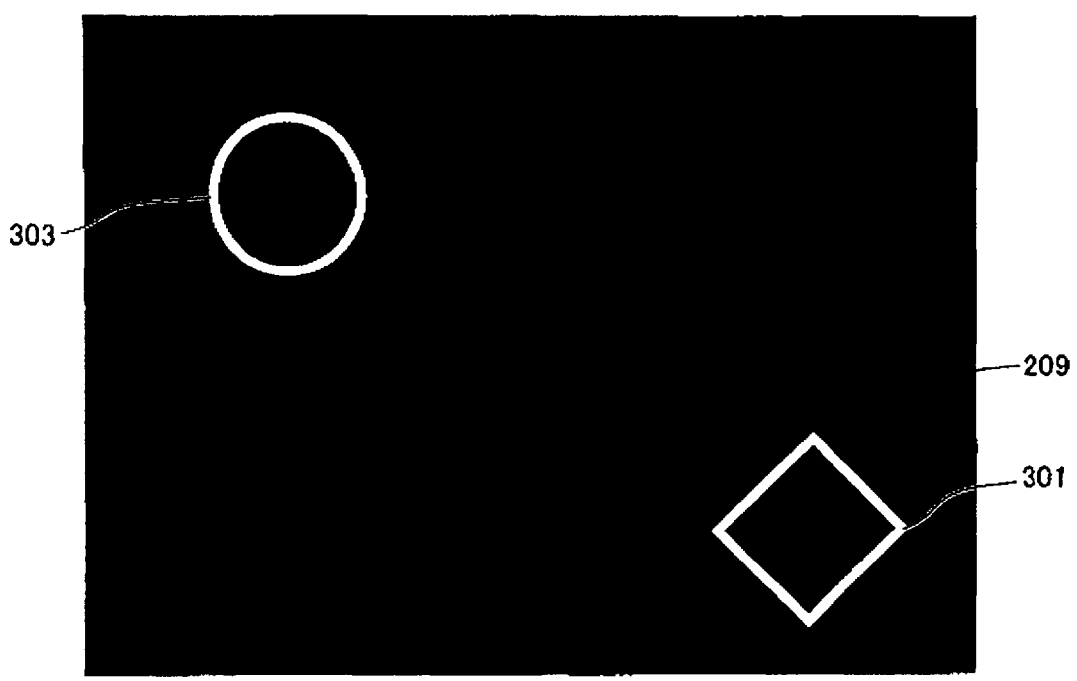
FIG. 11 illustrates a disparity map showing an intensity distribution constituted by positive values.

FIG. 11 shows an exemplary manner in which the disparity map produced using Expression 5 is displayed. As described above, Expression 5 produces a disparity map that changes on such a scale that the ratio of the blur width calculated as the arithmetic average to the blur width calculated as the geometric average is raised to the second power. Therefore, when compared with the edge portions of the rectangular object 301 and the circular object 303 shown in FIG. 10, the edge portions of the rectangular object 301 and the circular object 303 shown in FIG. 11 are exaggerated.

Third Embodiment

The image processor 205 uses Expression 10 to produce a signed disparity map. Namely, the disparity map provides an intensity distribution constituted by positive and negative values calculated using Expression 10. Expression 10 is shown again in the following.

$$\frac{D_1(x, y) - D_2(x, y)}{2} \cdot \text{sign}\left(\frac{\partial N(x, y)}{\partial x}\right) = \qquad \text{Expression 10}$$

$$\frac{\frac{Rt(x, y) - Lt(x, y)}{2}}{\sqrt{Lt(x, y) \cdot Rt(x, y)}} \cdot [D(x, y) + 1] \cdot \text{sign}\left(\frac{\partial N(x, y)}{\partial x}\right)$$

Here, the horizontal derivative is defined as follows.

$$\frac{\partial N(x, y)}{\partial x} = N(x + 1, y) - N(x, y) \qquad \text{Expression 13}$$

Figure 12A:
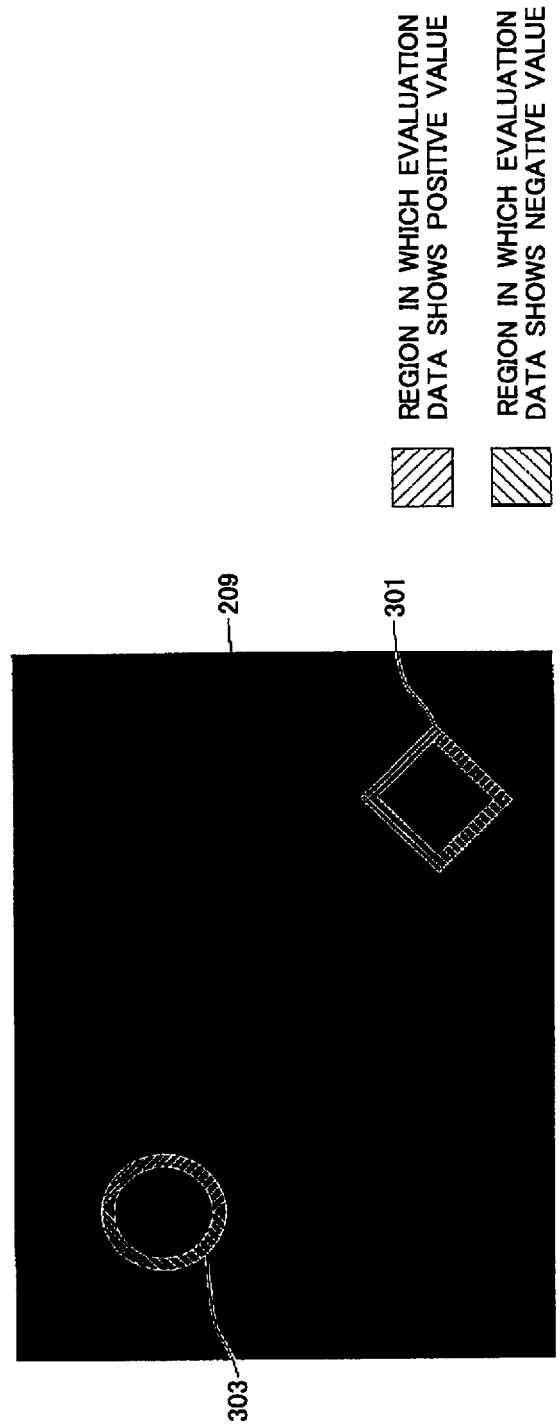
FIGS. 12A and 12B show disparity maps each showing an intensity distribution constituted by positive and negative values.
Figure 12B:
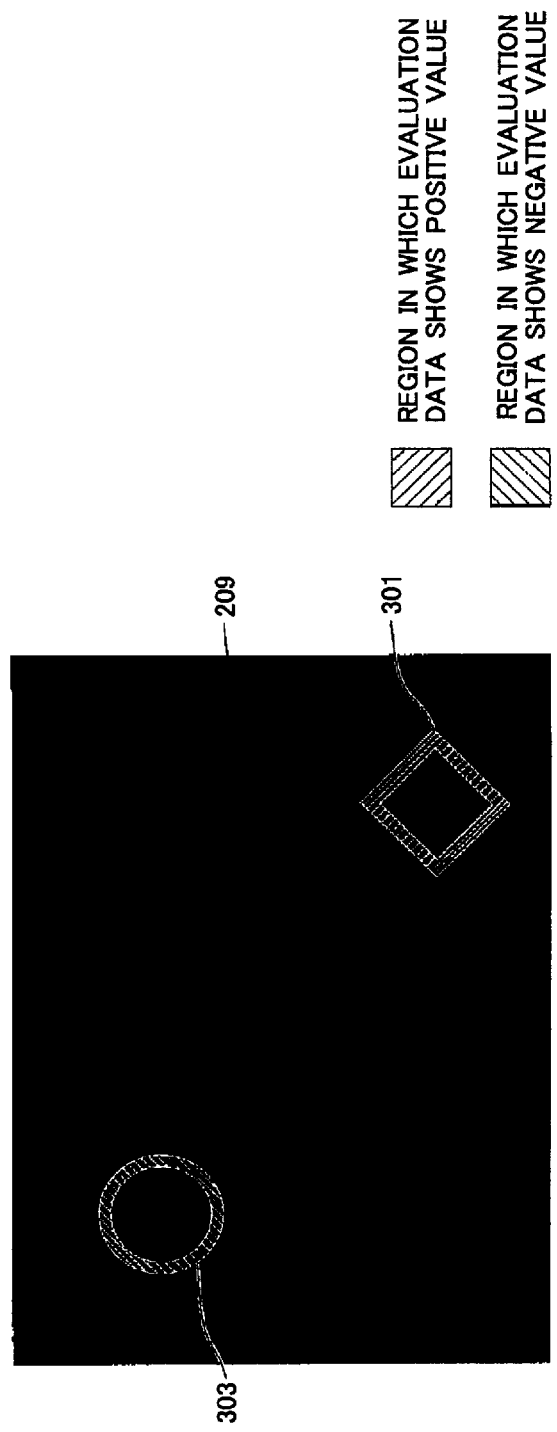

FIGS. 12A and 12B show disparity maps each showing an intensity distribution constituted by positive and negative values. FIG. 12A shows an exemplary manner in which a disparity map obtained using Expression 8 is displayed. In the edge portions, the region of the positive values is defined by the diagonally right down hatching and the region of the negative values is defined by the diagonally left down hatching.

The rectangular object 301 is in the fore-focus region. When the subject is in the fore-focus region, a negative sign is obtained for the region in which the color changes from the white background region to the black rectangular object 301 toward the right in the horizontal direction, namely, the region in which it becomes darker toward the right. On the other hand, a positive sign is obtained for the region in which the color changes from the black rectangular object 301 to the white background region toward the right in the horizontal direction, namely, in the region in which it becomes brighter toward the right.

The circular object 303 is in the back-focus region. When the subject is in the back-focus region, a positive sign is obtained for the region in which the color changes from the white background region to the black rectangular object 301 toward the right in the horizontal direction. On the other hand, a negative sign is obtained for the region in which the color changes from the black rectangular object 301 to the white background region toward the right in the horizontal direction. As described above, the positive and negative values are mixed in the fore-focus region and the back-focus region.

FIG. 12B shows an exemplary manner in which the disparity map produced by using Expression 10 is displayed. When the subject is in the fore-focus region, a positive sign is obtained for the region in which the color changes from the white background region to the black rectangular object 301 toward the right in the horizontal direction, namely, the region in which it becomes darker toward the right. Likewise, a positive sign is obtained for the region in which the color changes from the black rectangular object 301 to the white background region toward the right in the horizontal direction, namely, in the region in which it becomes brighter toward the right.

When the subject is in the back-focus region, a negative sign is obtained for the region in which the color changes from the white background region to the black rectangular object 301 toward the right in the horizontal direction. Likewise, a negative sign is obtained for the region in which the color changes from the black rectangular object 301 to the white background region toward the right in the horizontal direction. As described above, only the positive values are obtained in the fore-focus region and only the negative values are obtained in the back-focus region. Since whether the subject is positioned in front of or behind the focus position is represented by the positive or negative sign of the value of the ratio, the position of the subject can be identified. Accordingly, the disparity map can be used to help image-capturing actions.

Here, the horizontal derivative can be defined as follows considering the left-right symmetry.

$$\frac{\partial N(x, y)}{\partial x} = \frac{[N(x+1, y) - N(x, y)] + [N(x, y) - N(x-1, y)]}{2} = \frac{N(x+1, y) - N(x-1, y)}{2}$$

Expression 14

From among various subject images represented by left and right parallax images, disparity information can be obtained not only for subject images represented by vertical lines but also for subject images that have at least the slightest component in diagonally vertical direction since the left and right blur widths are separated from each other. No disparity information is produced only for subject images represented only by perfectly horizontal lines. Therefore, the horizontal derivative of the subject images can be expanded for the diagonal directions in which parallax can be detected. In other words, the horizontal derivative can also be defined as follows.

$$\frac{\partial N(x, y)}{\partial x} = \frac{\frac{N(x+1, y) - N(x-1, y)}{2} + \frac{N(x+1, y+1) - N(x-1, y-1)}{2} + \frac{N(x+1, y-1) - N(x-1, y+1)}{2}}{3}$$

Expression 15

The three terms of the numerator on the right-hand side of Expression 15 all have horizontal derivative components.

The interval of the denominator of the horizontal first derivative may be determined in the following manner. Considering the fact that blur in a subject image increases as parallax in the subject image increases when the monocular pupil-division image-capturing technique is used to capture the subject image, the interval of the derivative may be increased as the blur width increases. In this way, more stable derivative values are obtained. Here, as the information regarding the blur width of each pixel, D(x, y) may be referred to as shown in the first embodiment. In other words, if Expression 14 is expanded in this way, the following Expression 16 is obtained. Note that dx takes an integer value.

$$dx = \text{MAX}(NX \cdot D(x, y), 1)$$

$$\frac{\partial N(x, y)}{\partial x} = \frac{N(x+dx, y) - N(x-dx, y)}{2dx}$$

Expression 16

Here, NX is set approximately equal to half the horizontal maximum disparity when the monocular pupil-division image-capturing technique is employed and is set to have a pixel width that is approximately 2.5% of the number of pixels in the horizontal direction in the entire image. For example, when the number of pixels in the horizontal direction is approximately 2,000, NX takes a value of approximately 50. In the case of Expression 15, the following Expression 17 is obtained.

$$\frac{\partial N(x, y)}{\partial x} = \frac{\frac{N(x+dx, y) - N(x-dx, y)}{2dx} + \frac{N(x+dx, y+dx) - N(x-dx, y-dx)}{2dx} + \frac{N(x+dx, y-dx) - N(x-dx, y+dx)}{2dx}}{3}$$

Expression 17

Fourth Embodiment

The image processor 205 produces a signed disparity map using Expression 18. In other words, only the sign is extracted from Expression 10 and Expression 2 is multiplied by the extracted sign. Namely, a disparity map is obtained that shows an intensity distribution constituted by positive and negative values that are calculated using the following Expression 18.

$$D(x, y) \cdot \text{sign}\left(\frac{D_1(x, y) - D_2(x, y)}{2} \cdot \frac{\partial N(x, y)}{\partial x}\right) \quad \text{Expression 18}$$

Also in the present embodiment, only positive values are obtained for the fore-focus region and only negative values are obtained for the back-focus region. Since whether the subject is positioned in front of or behind the focus position is represented by the positive or negative sign of the value of the ratio, the position of the subject can be identified. In the present embodiment, a disparity map that is expanded with a sign is obtained when compared with the disparity map relating to the first embodiment.

Fifth Embodiment

The image processor 205 produces a signed disparity map using Expression 19. In other words, only the sign is extracted from Expression 10 and Expression 5 is multiplied with the extracted sign. Namely, a disparity map is obtained that shows an intensity distribution constituted by positive and negative values that are calculated using the following Expression 19.

$$\frac{D_1(x, y) + D_2(x, y)}{2} \cdot \text{sign}\left(\frac{D_1(x, y) - D_2(x, y)}{2} \cdot \frac{\partial N(x, y)}{\partial x}\right) \quad \text{Expression 19}$$

Also in the present embodiment, only positive values are obtained for the fore-focus region and only negative values are obtained for the back-focus region. Since whether the subject is positioned in front of or behind the focus position is represented by the positive or negative sign of the value of the ratio, the position of the subject can be identified. Furthermore, since $D_1(x, y)+D_2(x, y)$ is present in Expression 19, a disparity map can be produced that changes on such a scale that the ratio of the blur width calculated as the arithmetic average to the blur width calculated as the geometric average is raised to the second power, differently from the first embodiment. Namely, the edge portions can be exaggerated.

The above-described first to fifth embodiments describe exemplary cases where a single-plate image-capturing technique is used to capture monochrome and parallax-multiplexed data. However, the following modification examples using different image sensors are also possible 1) Double-Plate Image-Capturing Technique for Monochrome and Single-Parallax Image Data Incoming light incident on a monocular lens is separated using a prism so that the optical intensity is divided in half in two directions, and a double-plate image-capturing technique is used with the use of a left parallax image sensor and a right parallax image sensor which respectively have only left parallax pixels and right parallax pixels. In this case, each pixel has two pieces of information, which are a right parallax pixel value and a left parallax pixel value. Thus, the interpolation performed to produce the left and right parallax images (2) in the first embodiment is no longer necessary.

The monocular lens may be structured such that an aperture equivalent to the hypothetical pupils shown in FIGS. 4A to 4D can be alternately inserted into the right and left sides. Furthermore, a left parallax image and a right parallax image may be obtained separately with two exposure operations using a typical monochrome image sensor having no-parallax pixels. In both cases, the interpolation performed to produce the left and right parallax images (2) in the first embodiment is no longer necessary.

2) Single-Plate Image-Capturing Technique for Color and Parallax-Multiplexed Mosaic Image Data a) When G pixels are parallax pixels in the Bayer arrangement The G parallax pixels are treated in the same manner as the monochrome parallax pixels in the first embodiment and interpolation is performed.

b) When the parallax pixel arrangement of the image-capturing apparatus described in Patent Document 1 is found for all of the R, G and B pixels.

A disparity map can be produced for each of the R, G and B color components.

To produce a disparity map only for the luminance plane, the disparity maps for the respective color planes are combined together according to the expression Y=0.3R+0.6G+0.1B.

Alternatively, the disparity map for the luminance plane is first produced in accordance with the above ratio and the same technique as in the first embodiment is then employed.

Figure 13A:
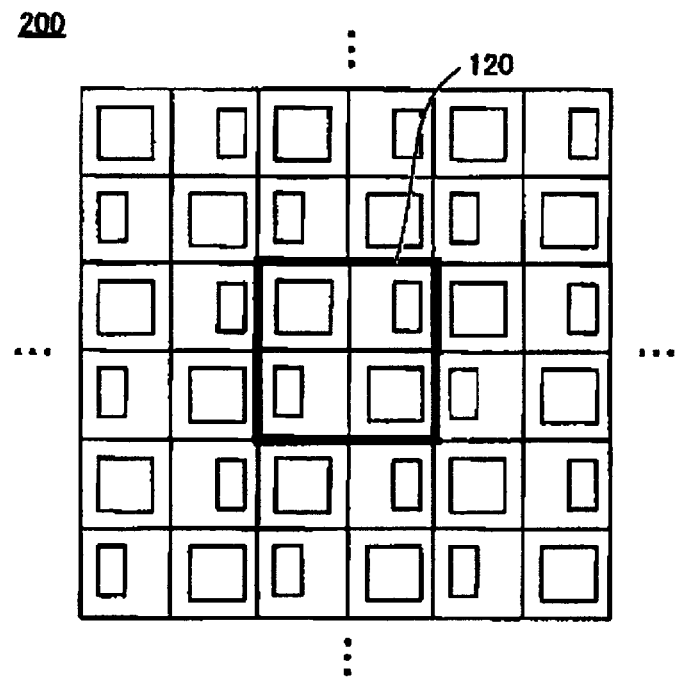
FIGS. 13A and 13B illustrate various pixel arrangements.
Figure 13A:
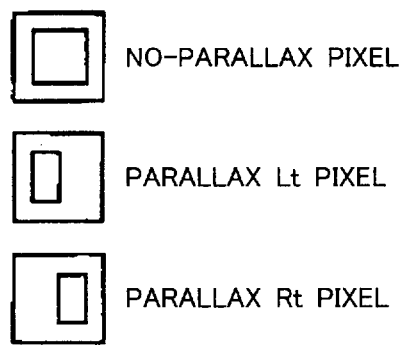
Figure 13B:
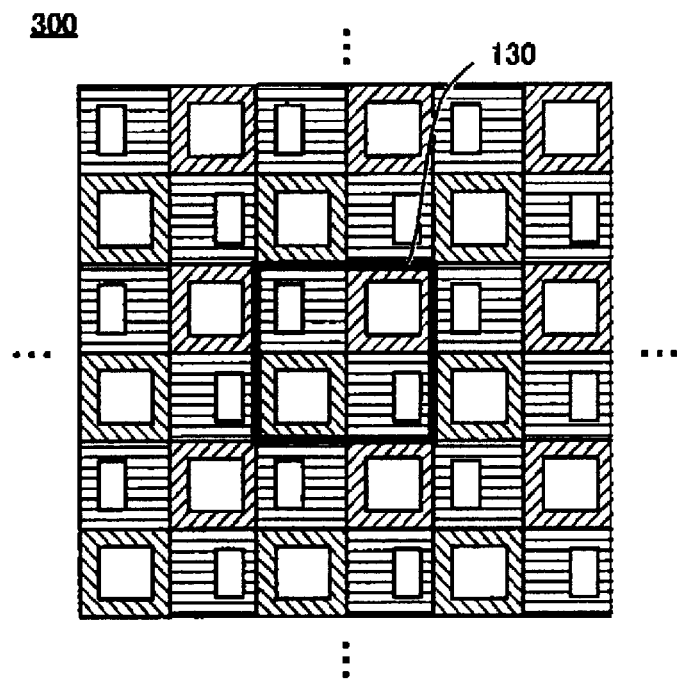
Figure 13B:
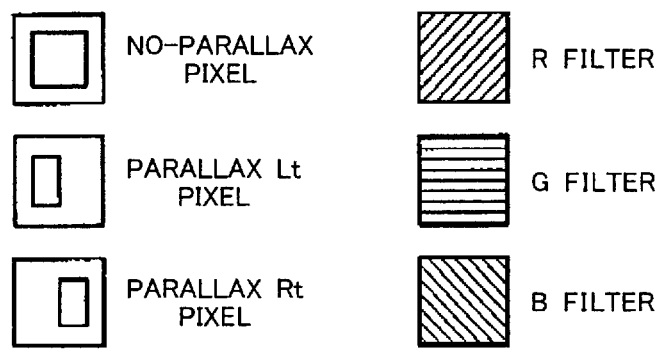

Furthermore, the following image sensors can be used. FIGS. 13A and 13B show various pixel arrangements. Image sensors 200 and 300 respectively have primitive lattices that are defined by the bold lines in FIGS. 13A and 13B and have patterns 120 and 130 that are each formed by 2×2 pixels. As shown in FIG. 13A, in the image sensor 200, no-parallax pixels are assigned to the upper left and lower right pixels in the pattern 120, a parallax Lt pixel is assigned to the lower left pixel, and a parallax Rt pixel is assigned to the upper right pixel.

As shown in FIG. 13B, the image sensor 300 employs the Bayer arrangement. Specifically speaking, green filters are assigned to two pixels of the upper left and lower right pixels, a red filter is assigned to one pixel of the lower left pixel, and a blue filter is assigned to one pixel of the upper right pixel. In the pattern 130, a parallax Lt pixel is assigned to the upper left pixel and a parallax Rt pixel is assigned to the lower right pixel.

The above description is made on the assumption that the left viewpoint point spread Lt+the right viewpoint point spread Rt=the point spread N of the no-parallax pixel. However, even when this relation does not hold true, it is possible to determine how the point spread is formed. Specifically speaking, when the above relation does not hold true, the geometric average between Lt and Rt takes a value of 0 and the value of D(x, y) diverges. Therefore, if the value of D(x, y) diverges, it can indicate that there is no overlap between Lt and Rt.

The above describes the disparity map as being used to help auto-focusing and image-capturing actions. In addition, the disparity map may be used as distance information to separate subjects from each other in the depth direction and perform white balance or other operations on each subject.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An image processing apparatus comprising:
   an image processor configured to perform operations including
      receiving at least two parallax images that are obtained from a subject image captured via a single optical system, the at least two parallax images including an image in a first viewpoint direction and an image in a second viewpoint direction,
      calculating, for each pixel, an arithmetic average and a geometric average between the image in the first viewpoint direction and the image in the second viewpoint direction,
      calculating, for each pixel, a ratio of the arithmetic average to the geometric average,
      calculating, on a pixel-by-pixel basis, a disparity between the image in the first viewpoint direction and the image in the second viewpoint direction based on the ratio, and
      giving to the disparity a sign that distinguishes whether the subject is in front of or behind a focus position of the optical system, based on a product of a sign of the disparity and a sign of a first derivative,
   wherein the image data produced by the image processor is converted by an LCD driver circuit onto a display signal and displayed on a display, and wherein the produced image data is stored in memory.

2. The image processing apparatus as set forth in claim 1, wherein the processor is further configured to:
   calculate, for each pixel, a difference between the image in the second viewpoint direction and the image in the first viewpoint direction, and
   calculate, on a pixel-by-pixel basis, the first derivative which has a component in a direction in which a viewpoint change occurs for an image in an intermediate viewpoint constituted by an average value between the image in the first viewpoint direction and the image in the second viewpoint direction.

3. An image processing apparatus comprising:
   an image processor configured to perform operations including
      receiving at least two parallax images that are obtained from a subject image captured via a single optical system, the at least two parallax images including an image in a first viewpoint direction and an image in a second viewpoint direction,
      calculating, for each pixel, a difference between the image in the second viewpoint direction and the image in the first viewpoint direction,
      calculating, on a pixel-by-pixel basis, a first derivative having a component in a direction in which a viewpoint change occurs, for an image in an intermediate viewpoint constituted by an average value between the image in the first viewpoint direction and the image in the second viewpoint direction, and
      distinguishing whether the subject is in front of or behind a focus position of the optical system, based on a product of a sign of the difference and a sign of the first derivative,
   wherein image data produced by the image processor is converted by an LCD driver circuit onto a display signal and displayed on a display, and wherein the produced image data is stored in memory.

4. The image processing apparatus as set forth in claim 3, wherein
   when the image in the first viewpoint direction corresponds to a left-viewpoint image and the image in the second viewpoint direction corresponds to a right-viewpoint image and when the first derivative is calculated in a direction from left to right,
   the subject is judged to be in front of the focus position of the optical system if the product of the sign of the difference and the sign of the first derivative indicates a positive value, and the subject is judged to be behind the focus position of the optical system when the product of the sign of the difference and the sign of the first derivative indicates a negative value.

5. The image processing apparatus as set forth in claim 1, wherein
   the image in the first viewpoint direction and the image in the second viewpoint direction are captured using an image sensor in which at least two types of pixels are periodically arranged on a single image-capturing plane, and the at least two types of pixels include a first parallax pixel having an aperture mask that transmits a partial luminous flux in the first viewpoint direction from among incoming luminous flux incident on the single image-capturing plane through the single optical system and a second parallax pixel having an aperture mask that transmits a partial luminous flux in the second viewpoint direction from among the incoming luminous flux incident on the single image-capturing plane through the single optical system.

6. An image processing apparatus comprising:
   an image processor configured to perform operations including
      obtaining first image data corresponding to a first viewpoint and second image data corresponding to a second viewpoint, the first and second image data being obtained via a single optical system or separate sharing optical systems,
      calculating a ratio of (i) a value obtained by an adding-based operation performed on a pixel value of the first image data and a corresponding pixel value of the second image data to (ii) a value obtained by a multiplying-based operation performed on the pixel value of the first image data and the corresponding pixel value of the second image data, and
      producing, in association with the first image data and the second image data, evaluation data regarding disparity between the first viewpoint and the second viewpoint,
      distinguishing whether a subject is in front of or behind a focus position of the optical systems, based on a positive or negative sign of a value of the ratio,
   wherein the evaluation data produced by the image processor is converted by an LCD driver circuit onto a display signal and displayed on a display, and wherein the produced evaluation data is stored in memory.

7. The image processing apparatus as set forth in claim 6, wherein
   the calculating the ratio includes calculating an arithmetic average between the pixel values as the value obtained by the adding-based operation and calculating a geometric average between the pixel values as the value obtained by the multiplying-based operation.

8. The image processing apparatus as set forth in claim 6, wherein the processor is further configured to represent whether the subject is positioned in front of or behind the focus position of the optical systems by the positive or negative sign of the value of the ratio.

9. The image processing apparatus as set forth in claim 8, wherein
the calculating the ratio includes multiplying the ratio with a difference between the pixel values and with a derivative value in a parallax direction of the value obtained by the adding-based operation.

10. An image-capturing apparatus comprising:
an image sensor; and
the image processing apparatus as set forth in claim 6, wherein
the first image data and the second image data are produced based on an output from the image sensor.

11. An image processing method comprising:
obtaining, by an image processor, first image data corresponding to a first viewpoint and second image data corresponding to a second viewpoint, the first and second image data being obtained via a single optical system or separate sharing optical systems;
calculating, by the image processor, a ratio of (i) a value obtained by an adding-based operation performed on a pixel value of the first image data and a corresponding pixel value of the second image data to (ii) a value obtained by a multiplying-based operation performed on the pixel value of the first image data and the corresponding pixel value of the second image data;
producing, by the image processor, in association with the first image data and the second image data, evaluation data regarding disparity between the first viewpoint and the second viewpoint; and
distinguishing, by the image processor, whether a subject is in front of or behind a focus position of the optical systems, based on a positive or negative sign of a value of the ratio,
wherein the evaluation data produced by the image processor is converted by an LCD driver circuit onto a display signal and displayed on a display, and wherein the produced evaluation data is stored in memory.

12. An image processing apparatus comprising:
an image processor configured to perform operations including
obtaining first image data corresponding to a first viewpoint and second image data corresponding to a second viewpoint, the first and second image data being obtained through a single optical system or separate sharing optical systems, and
eliminating disparity information between the first image data and the second image data using different averaging operations, and
comparing results of the averaging operations to eliminate an image structure in order to produce new data regarding disparity, thereby producing a disparity map,
distinguishing whether the subject is in front of or behind a focus position of the optical systems, based on a product of (1) a sign of a difference between the first image data and the second image data and (2) a sign of the first derivative,
wherein data produced by the image processor is converted by the LCD driver circuit onto a display signal and displayed on a display, and wherein the produced data are stored in memory.

13. The image processing apparatus as set forth in claim 3, wherein the distinguishing whether the subject is in front of or behind a focus position of the optical system is further based on whether the product of the sign of the difference and the sign of the first derivative indicates a positive value or a negative value.

14. The image processing apparatus as set forth in claim 3, wherein
the image in the first viewpoint direction corresponds to a left-viewpoint image, the image in the second viewpoint direction corresponds to a right-viewpoint image, and the first derivative is calculated in a direction from left to right.

15. The image processing apparatus as set forth in claim 3, wherein
the first derivative is calculated in a direction from the first viewpoint direction to the second viewpoint direction.

16. The image processing apparatus as set forth in claim 1, wherein
the image in the first viewpoint direction and the image in the second viewpoint direction are captured using an image sensor that receives a partial luminous flux in the first viewpoint direction from among incoming luminous flux incident on a single image-capturing plane through the single optical system and receives a partial luminous flux in the second viewpoint direction from among incoming luminous flux incident on the single image-capturing plane through the single optical system.

* * * * *